US012800734B2

(12) United States Patent
Boloorian

(10) Patent No.: US 12,800,734 B2
(45) Date of Patent: Nov. 17, 2026

(54) DATA REFINEMENT IN OPTICAL SYSTEMS

(71) Applicant: SiLC Technologies, Inc., Monrovia, CA (US)

(72) Inventor: Majid Boloorian, San Diego, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 917 days.

(21) Appl. No.: 18/106,995

(22) Filed: Feb. 7, 2023

(65) Prior Publication Data

US 2024/0264289 A1 Aug. 8, 2024

(51) Int. Cl.
*G01S 7/4912* (2020.01)
*G01S 17/58* (2006.01)

(52) U.S. Cl.
CPC ............ *G01S 7/4912* (2013.01); *G01S 17/58* (2013.01)

(58) Field of Classification Search
CPC ............................... G01S 7/4866; G01S 17/34
See application file for complete search history.

(56) References Cited

U.S. PATENT DOCUMENTS

| | | | |
|---|---|---|---|
| 4,168,906 | A | 9/1979 | Schwiesow |
| 4,262,993 | A | 4/1981 | Burns et al. |
| 4,472,020 | A | 9/1984 | Evanchuk |
| 4,523,803 | A | 6/1985 | Arao et al. |
| 4,721,385 | A | 1/1988 | Jelalian et al. |
| 4,786,132 | A | 11/1988 | Gordon |
| 4,845,703 | A | 7/1989 | Suzuki |
| 4,914,665 | A | 4/1990 | Sorin |
| 4,955,028 | A | 9/1990 | Alfeness et al. |

(Continued)

FOREIGN PATENT DOCUMENTS

| | | | |
|---|---|---|---|
| CA | 3191688 | A | 3/2022 |
| CN | 1668939 | A | 9/2005 |

(Continued)

OTHER PUBLICATIONS

Rodriquez, Kari, International Search Report and Written Opinion, PCT/2024/010607, International Searching Authority, United States Patent and Trademark Office, Apr. 18, 2024.

(Continued)

*Primary Examiner* — Christopher D Hutchens
(74) *Attorney, Agent, or Firm* — Gavrilovich, Dodd & Lindsey LLP

(57) ABSTRACT

Operating a LIDAR system includes transmitting a system output signal from the LIDAR system such that a sample region is illuminated by the system output signal. During illumination of the sample region, the system output signal includes a check data period and multiple subject data periods. A frequency of the system output signal changes at different rates during the subject data periods. Light that returns to the LIDAR system from the system output signal is combined with light from a reference signal so as to generate a beating signal beating at a beat frequency. The reference signal includes light that has not exited from the LIDAR system. A comparative beat frequency is calculated. The comparative beat frequency approximates a value of the beat frequency of the beating signal during the check data period. Additionally, the comparative beat frequency is calculated from the beat frequencies of the beating signal during the subject data periods.

20 Claims, 8 Drawing Sheets

(56) References Cited

U.S. PATENT DOCUMENTS 4,987,832 A 1/1991 Klink et al.
4,995,720 A 2/1991 Amzajerdian
5,041,832 A 8/1991 Gulczynski
5,194,906 A 3/1993 Kimura et al.
5,289,252 A 2/1994 Nourrcier
5,305,412 A 4/1994 Paoli
5,323,223 A 6/1994 Hayes
5,396,328 A 3/1995 Jestel et al.
5,500,910 A 3/1996 Boudreau et al.
5,847,816 A 12/1998 Zediker et al.
5,889,490 A 3/1999 Wachter et al.
5,953,468 A 9/1999 Finnila et al.
5,977,538 A 11/1999 Unger et al.
5,995,810 A 11/1999 Karasawa
6,035,083 A 3/2000 Brennan, III et al.
6,040,898 A 3/2000 Mrosik et al.
6,108,472 A 8/2000 Rickman et al.
6,285,288 B1 9/2001 Langdon et al.
6,400,500 B1 6/2002 Tidmarsh et al.
6,480,513 B1 11/2002 Kapany et al.
6,556,759 B2 4/2003 Roberts et al.
6,567,573 B1 5/2003 Domash et al.
6,687,010 B1 2/2004 Horri et al.
6,921,490 B1 7/2005 Qian et al.
6,959,133 B2 10/2005 Vancoill et al.
6,970,621 B1 11/2005 Fried
6,977,502 B1 12/2005 Hertz
7,345,744 B2 3/2008 Halmos et al.
7,375,877 B1 5/2008 Di Teodoro et al.
7,535,390 B2 5/2009 Hsu
7,907,333 B2 3/2011 Coyle
8,165,433 B2 4/2012 Jenkins et al.
8,213,751 B1 7/2012 Ho et al.
8,311,374 B2 11/2012 Hochberg et al.
8,326,100 B2 12/2012 Chen et al.
8,410,566 B2 4/2013 Qian et al.
8,541,744 B1 9/2013 Liu
8,558,993 B2 10/2013 Newbury et al.
8,885,678 B1 11/2014 Kupershmidt
9,157,790 B2 10/2015 Shpunt et al.
9,176,282 B2 11/2015 Pottier et al.
9,217,831 B1 12/2015 Asghari
9,235,097 B2 1/2016 Meade et al.
9,270,078 B2 2/2016 Rickman et al.
9,310,471 B2 4/2016 Sayyah et al.
9,310,487 B2 4/2016 Sakimura et al.
9,519,052 B2 12/2016 Gusev
9,551,832 B1 1/2017 Bovington et al.
9,575,341 B2 2/2017 Heck et al.
9,606,234 B2 3/2017 Major, Jr. et al.
9,625,580 B2 4/2017 Kotelnikov et al.
9,735,885 B1 8/2017 Sayyah et al.
9,740,079 B1 8/2017 Davids et al.
9,748,726 B1 8/2017 Morton et al.
9,753,351 B2 9/2017 Eldada
9,778,363 B2 10/2017 Kadambi et al.
9,798,166 B1 10/2017 Sharma et al.
9,823,118 B2 11/2017 Doylend et al.
9,841,495 B2 12/2017 Campbell et al.
9,851,443 B2 12/2017 Chen
9,857,468 B1 1/2018 Eichenholz et al.
9,893,737 B1 2/2018 Keramat et al.
10,003,168 B1 6/2018 Villeneuve
10,007,060 B1 6/2018 Qian et al.
10,094,916 B1 10/2018 Droz et al.
10,137,903 B2 11/2018 Tascione et al.
10,222,474 B1 3/2019 Raring et al.
10,274,599 B2 4/2019 Schmalenberg
10,281,322 B2 5/2019 Doylend et al.
10,345,447 B1 7/2019 Hicks
10,345,497 B2 7/2019 Wu et al.
10,397,019 B2 8/2019 Hartung et al.
10,564,268 B2 2/2020 Turbide et al.
10,605,901 B2 3/2020 Lee et al.
10,627,496 B2 4/2020 Schmalenberg et al.
10,649,306 B2 5/2020 Skirlo et al.
10,739,256 B1 8/2020 Rickman et al.
10,761,195 B2 9/2020 Donovan
10,782,782 B1 9/2020 DeSalvo et al.
10,788,582 B2 9/2020 Feng et al.
10,816,649 B1 10/2020 Keyser et al.
10,845,480 B1 11/2020 Shah et al.
10,901,074 B1 1/2021 Pan et al.
10,962,713 B2 3/2021 Lee
11,022,683 B1 6/2021 Rezk
11,067,668 B1 7/2021 Bravo
11,114,815 B1 9/2021 Chen et al.
11,119,219 B1 9/2021 LaChapelle et al.
11,162,789 B2 11/2021 Lodin et al.
11,170,476 B1 11/2021 Toshiwal et al.
11,175,388 B1 11/2021 Wood et al.
11,221,404 B1 1/2022 DeSalvo et al.
11,300,683 B2 4/2022 Bao et al.
11,378,691 B2 7/2022 Boloorian et al.
11,448,729 B2 9/2022 Baba et al.
11,454,724 B2 9/2022 Michaels et al.
11,486,975 B1 11/2022 Xiao
11,493,753 B1 11/2022 Wood et al.
11,525,916 B2 12/2022 Avci et al.
11,536,805 B2 12/2022 Asghari et al.
11,579,300 B1 2/2023 Li
11,635,491 B2 4/2023 Asghari et al.
11,710,938 B2 7/2023 Kwon et al.
11,714,167 B2 8/2023 Feng et al.
11,768,419 B1 9/2023 Schroder et al.
11,815,720 B1 11/2023 Tavallaee et al.
11,860,304 B2 1/2024 Ren et al.
11,908,075 B2 2/2024 Gorantla
2002/0031304 A1 3/2002 Roberts et al.
2002/0105632 A1 8/2002 Holton
2002/0122398 A1 9/2002 Jou
2002/0159700 A1 10/2002 Coroy et al.
2003/0030582 A1 2/2003 Vickers
2003/0031407 A1 2/2003 Weisberg et al.
2003/0142943 A1 7/2003 Yegnanarayanan et al.
2003/0183603 A1 10/2003 Forsman et al.
2003/0212520 A1 11/2003 Campos et al.
2003/0231686 A1 12/2003 Liu
2004/0062469 A1 4/2004 Ionov
2004/0081388 A1 4/2004 Koyama
2004/0085612 A1 5/2004 Livingston et al.
2004/0136412 A1 7/2004 Jones
2004/0228564 A1 11/2004 Gunn, III et al.
2004/0233964 A1 11/2004 Yamanaka et al.
2004/0249561 A1 12/2004 Capozzi et al.
2005/0123227 A1 6/2005 Vonsovici et al.
2005/0135730 A1 6/2005 Welch et al.
2005/0213103 A1 9/2005 Everett et al.
2005/0219068 A1 10/2005 Jones et al.
2005/0237617 A1 10/2005 Carr et al.
2005/0244103 A1 11/2005 Kwakernaak
2006/0078257 A1 4/2006 Park et al.
2006/0114447 A1 6/2006 Harris et al.
2006/0232763 A1 10/2006 Jokinen
2007/0024849 A1 2/2007 Carrig et al.
2007/0024956 A1 2/2007 Coyle
2007/0036486 A1 2/2007 Miyadera et al.
2007/0103362 A1 5/2007 Arikan et al.
2007/0171407 A1 7/2007 Cole et al.
2007/0189341 A1 8/2007 Belsley
2007/0223856 A1 9/2007 Nunoya et al.
2008/0088184 A1 4/2008 Tung et al.
2008/0123170 A1 5/2008 Reichert et al.
2008/0174461 A1 7/2008 Hsu
2008/0176681 A1 7/2008 Donahoe
2008/0181550 A1 7/2008 Earnshaw
2008/0205461 A1 8/2008 Henrichs
2009/0046746 A1 2/2009 Munroe et al.
2009/0128797 A1 5/2009 Walsh
2009/0195769 A1 8/2009 Luo et al.
2009/0279070 A1 11/2009 Ueno
2009/0309782 A1 12/2009 Takabayashi et al.
2010/0027379 A1 2/2010 Saulnier et al.
2010/0046802 A1 2/2010 Watanabe et al.

(56) References Cited

U.S. PATENT DOCUMENTS

2010/0085992 A1 4/2010 Rakuljic et al.
2010/0159858 A1 6/2010 Dent et al.
2010/0187442 A1 7/2010 Hochberg et al.
2010/0271614 A1 10/2010 Albuquerque et al.
2010/0277714 A1 11/2010 Pedersen et al.
2010/0280765 A1 11/2010 Marquardt et al.
2010/0296077 A1 11/2010 Scott et al.
2010/0309391 A1 12/2010 Plut
2011/0026643 A1 2/2011 Ruelke et al.
2011/0068425 A1 3/2011 Liao et al.
2011/0068426 A1 3/2011 Zheng et al.
2011/0091155 A1 4/2011 Yilmaz et al.
2011/0095167 A1 4/2011 Feng et al.
2011/0141471 A1 6/2011 Schlotterbeck et al.
2011/0164845 A1 7/2011 Jenkins et al.
2011/0241895 A1 10/2011 Griffin
2012/0038506 A1 2/2012 Kanamoto et al.
2012/0062230 A1 3/2012 Vaughan, Jr. et al.
2012/0081786 A1 4/2012 Mizuyama et al.
2012/0098935 A1 4/2012 Schmidt et al.
2012/0106579 A1 5/2012 Roos et al.
2012/0120382 A1 5/2012 Silny et al.
2012/0182544 A1 7/2012 Asahara et al.
2012/0206712 A1 8/2012 Chang et al.
2013/0044309 A1 2/2013 Dakin et al.
2013/0044311 A1 2/2013 Rakuljic
2013/0051655 A1 2/2013 Collard et al.
2013/0056623 A1 3/2013 Lipson et al.
2013/0083389 A1 4/2013 Dakin et al.
2013/0094074 A1 4/2013 Asghari et al.
2013/0162976 A1 6/2013 Dakin et al.
2013/0206967 A1 8/2013 Shpunt et al.
2013/0242400 A1 9/2013 Chen
2013/0321791 A1 12/2013 Feldkhun et al.
2014/0035776 A1 2/2014 Sochen et al.
2014/0036252 A1 2/2014 Amzajerdian et al.
2014/0054451 A1 2/2014 Abedin et al.
2014/0112357 A1 4/2014 Abedin et al.
2014/0133864 A1 5/2014 Asghari et al.
2014/0153931 A1 6/2014 Doerr
2014/0169392 A1 6/2014 Kim
2014/0211298 A1 7/2014 Sayyah et al.
2014/0269790 A1 9/2014 Sebastian et al.
2014/0332918 A1 11/2014 Li et al.
2014/0376000 A1 12/2014 Swanson et al.
2014/0376001 A1 12/2014 Swanson
2015/0055115 A1 2/2015 Pedersen et al.
2015/0056740 A1 2/2015 Menezo
2015/0109603 A1 4/2015 Kim et al.
2015/0171593 A1 6/2015 Duan et al.
2015/0177367 A1* 6/2015 Sebastian ................ G01S 17/06
356/5.09
2015/0177383 A1 6/2015 Ruff et al.
2015/0185244 A1 7/2015 Inoue et al.
2015/0207296 A1 7/2015 Rickman et al.
2015/0260843 A1 9/2015 Lewis
2015/0333480 A1 11/2015 Santis et al.
2015/0346340 A1 12/2015 Yaacobi et al.
2015/0378012 A1 12/2015 Sayyah et al.
2015/0378187 A1 12/2015 Heck et al.
2016/0084945 A1 3/2016 Rodrigo et al.
2016/0161600 A1 6/2016 Eldada et al.
2016/0170141 A1 6/2016 Luo et al.
2016/0209594 A1 7/2016 Bahl
2016/0223663 A1 8/2016 Schmalenberg et al.
2016/0261091 A1 9/2016 Santis et al.
2016/0274226 A1 9/2016 Lewis
2016/0290891 A1 10/2016 Feng et al.
2016/0291135 A1 10/2016 Ando et al.
2016/0299228 A1 10/2016 Maleki et al.
2016/0306043 A1 10/2016 Moss et al.
2016/0324438 A1 11/2016 Halpern et al.
2016/0341818 A1 11/2016 Gilliland et al.
2016/0373191 A1 12/2016 Fathololoumi et al.
2016/0377721 A1 12/2016 Lardin et al.
2016/0377722 A1 12/2016 Lardin et al.
2017/0003451 A1 1/2017 Ma et al.
2017/0040775 A1 2/2017 Takabayashi et al.
2017/0059779 A1 3/2017 Okayama
2017/0067985 A1 3/2017 Schwarz et al.
2017/0098917 A1 4/2017 Popovic et al.
2017/0108649 A1 4/2017 Dallessasse et al.
2017/0139411 A1 5/2017 Hartung et al.
2017/0146639 A1 5/2017 Carothers
2017/0146641 A1 5/2017 Walsh et al.
2017/0153319 A1 6/2017 Villeneuve et al.
2017/0155225 A1 6/2017 Villeneuve et al.
2017/0184450 A1 6/2017 Doylend et al.
2017/0207600 A1 7/2017 Klamkin et al.
2017/0268866 A1 9/2017 Berz
2017/0269198 A1 9/2017 Hall et al.
2017/0269215 A1 9/2017 Hall et al.
2017/0299697 A1 10/2017 Swanson
2017/0299721 A1 10/2017 Eichenholz et al.
2017/0307648 A1 10/2017 Kotake et al.
2017/0307736 A1 10/2017 Donovan
2017/0328988 A1 11/2017 Magee et al.
2017/0343652 A1 11/2017 de Mersseman et al.
2017/0343791 A1 11/2017 Swanson
2017/0350965 A1 12/2017 Schmalenberg
2017/0350983 A1 12/2017 Hall et al.
2017/0356983 A1 12/2017 Jeong et al.
2017/0371227 A1 12/2017 Skirlo et al.
2017/0372602 A1 12/2017 Gilliland et al.
2018/0002432 A1 1/2018 Gilliland et al.
2018/0003805 A1 1/2018 Popovich et al.
2018/0024246 A1 1/2018 Jeong et al.
2018/0031680 A1 2/2018 Lee et al.
2018/0039154 A1 2/2018 Hashemi et al.
2018/0050704 A1 2/2018 Tascione et al.
2018/0073932 A1 3/2018 Minet et al.
2018/0088211 A1 3/2018 Gill et al.
2018/0095284 A1 4/2018 Welch et al.
2018/0102442 A1 4/2018 Wang et al.
2018/0103431 A1 4/2018 Suh et al.
2018/0113216 A1 4/2018 Kremer et al.
2018/0120433 A1 5/2018 Eichenholz et al.
2018/0120436 A1 5/2018 Smits
2018/0136321 A1 5/2018 Verghese et al.
2018/0143322 A1 5/2018 Rosenzweig et al.
2018/0143374 A1 5/2018 Coolbaugh et al.
2018/0149752 A1 5/2018 Tadano
2018/0164408 A1 6/2018 Hall et al.
2018/0172918 A1 6/2018 Lane et al.
2018/0188371 A1 7/2018 Bao et al.
2018/0217471 A1 8/2018 Lee et al.
2018/0224547 A1 8/2018 Crouch et al.
2018/0231643 A1 8/2018 Lee et al.
2018/0269890 A1 9/2018 Ojeda
2018/0287343 A1 10/2018 Morrison et al.
2018/0306925 A1 10/2018 Hosseini et al.
2018/0329037 A1 11/2018 Bozchalooi et al.
2018/0331493 A1 11/2018 Lin et al.
2018/0348343 A1 12/2018 Achour et al.
2018/0351317 A1 12/2018 Vermeulen
2018/0356344 A1 12/2018 Yi
2018/0356522 A1 12/2018 Kikuchi et al.
2018/0356528 A1 12/2018 Schaffner et al.
2018/0359033 A1 12/2018 Xu et al.
2018/0364334 A1 12/2018 Xiang et al.
2018/0364336 A1 12/2018 Hosseini et al.
2018/0372517 A1 12/2018 Yao et al.
2018/0372530 A1 12/2018 Welle et al.
2018/0372870 A1 12/2018 Puglia
2018/0375284 A1 12/2018 Permogorov
2019/0004151 A1 1/2019 Abediasl et al.
2019/0011558 A1 1/2019 Crouch et al.
2019/0011559 A1 1/2019 Desai et al.
2019/0018110 A1 1/2019 Kremer et al.
2019/0018121 A1 1/2019 Sayyah et al.
2019/0018139 A1 1/2019 Sayyah et al.
2019/0018140 A1 1/2019 Sarkissian et al.
2019/0018144 A1 1/2019 Imaki et al.
2019/0018197 A1 1/2019 Boutami et al.

(56) References Cited

U.S. PATENT DOCUMENTS

| | | | |
|---|---|---|---|
| 2019/0025094 | A1 | 1/2019 | Lewis et al. |
| 2019/0025426 | A1 | 1/2019 | Satyan et al. |
| 2019/0025431 | A1 | 1/2019 | Satyan et al. |
| 2019/0027897 | A1 | 1/2019 | Wei et al. |
| 2019/0033453 | A1 | 1/2019 | Crouch et al. |
| 2019/0049569 | A1 | 2/2019 | Kim et al. |
| 2019/0064329 | A1 | 2/2019 | Liu et al. |
| 2019/0064332 | A1 | 2/2019 | Schmalenberg et al. |
| 2019/0064358 | A1 | 2/2019 | Desai et al. |
| 2019/0072651 | A1 | 3/2019 | Halmos et al. |
| 2019/0072672 | A1 | 3/2019 | Yao |
| 2019/0086514 | A1 | 3/2019 | Dussan et al. |
| 2019/0086518 | A1 | 3/2019 | Halstig et al. |
| 2019/0086550 | A1 | 3/2019 | Dussan et al. |
| 2019/0096259 | A1 | 3/2019 | McQuillen et al. |
| 2019/0101647 | A1 | 4/2019 | Feshali et al. |
| 2019/0107623 | A1 | 4/2019 | Campbell et al. |
| 2019/0120939 | A1 | 4/2019 | O'Keeffe |
| 2019/0146074 | A1 | 5/2019 | Hjelmstad |
| 2019/0146087 | A1 | 5/2019 | Mansur et al. |
| 2019/0146164 | A1 | 5/2019 | Krichevsky |
| 2019/0154816 | A1 | 5/2019 | Hughes et al. |
| 2019/0154832 | A1 | 5/2019 | Maleki et al. |
| 2019/0154835 | A1 | 5/2019 | Maleki et al. |
| 2019/0179012 | A1 | 6/2019 | Heo |
| 2019/0187269 | A1 | 6/2019 | Tong et al. |
| 2019/0201023 | A1 | 7/2019 | Shelton, IV et al. |
| 2019/0204419 | A1 | 7/2019 | Baba et al. |
| 2019/0204441 | A1 | 7/2019 | Feneyrou et al. |
| 2019/0204443 | A1 | 7/2019 | Yao et al. |
| 2019/0250253 | A1 | 8/2019 | Hung et al. |
| 2019/0250396 | A1 | 8/2019 | Blanche et al. |
| 2019/0257924 | A1 | 8/2019 | Li et al. |
| 2019/0257927 | A1 | 8/2019 | Yao |
| 2019/0265351 | A1 | 8/2019 | Madison et al. |
| 2019/0266741 | A1 | 8/2019 | Uehara |
| 2019/0271767 | A1 | 9/2019 | Keilaf et al. |
| 2019/0280453 | A1 | 9/2019 | Gopinath et al. |
| 2019/0293794 | A1 | 9/2019 | Zhang et al. |
| 2019/0302262 | A1 | 10/2019 | Singer |
| 2019/0302268 | A1 | 10/2019 | Singer et al. |
| 2019/0310372 | A1 | 10/2019 | Crouch et al. |
| 2019/0310377 | A1 | 10/2019 | Lodin et al. |
| 2019/0317195 | A1 | 10/2019 | Sun et al. |
| 2019/0331797 | A1 | 10/2019 | Singer et al. |
| 2019/0339388 | A1 | 11/2019 | Crouch et al. |
| 2019/0339389 | A1 | 11/2019 | Russo et al. |
| 2019/0341739 | A1 | 11/2019 | Loh et al. |
| 2019/0346056 | A1 | 11/2019 | Staiger et al. |
| 2019/0346568 | A1 | 11/2019 | Feng et al. |
| 2019/0353787 | A1 | 11/2019 | Petit |
| 2019/0353789 | A1* | 11/2019 | Boloorian ............... G01S 17/42 |
| 2019/0353977 | A1 | 11/2019 | Hung |
| 2019/0361122 | A1 | 11/2019 | Crouch et al. |
| 2019/0369244 | A1 | 12/2019 | Asghari et al. |
| 2019/0369251 | A1 | 12/2019 | Feng et al. |
| 2019/0372307 | A1 | 12/2019 | Morton |
| 2019/0377135 | A1 | 12/2019 | Masouri Rad et al. |
| 2019/0383907 | A1 | 12/2019 | Belsley et al. |
| 2019/0391242 | A1 | 12/2019 | Asghari et al. |
| 2019/0391243 | A1 | 12/2019 | Nicolaescu |
| 2020/0018857 | A1 | 1/2020 | Feng et al. |
| 2020/0021082 | A1* | 1/2020 | Rakuljic ............... H01S 5/4012 |
| 2020/0025898 | A1 | 1/2020 | Ain-Kedem et al. |
| 2020/0025926 | A1 | 1/2020 | Asghari et al. |
| 2020/0043176 | A1 | 2/2020 | Maila et al. |
| 2020/0049799 | A1 | 2/2020 | Ando et al. |
| 2020/0057143 | A1 | 2/2020 | Asghari et al. |
| 2020/0064116 | A1 | 2/2020 | Salvade et al. |
| 2020/0064477 | A1 | 2/2020 | Komatsuzaki |
| 2020/0064483 | A1 | 2/2020 | Li et al. |
| 2020/0072978 | A1 | 3/2020 | Boloorian et al. |
| 2020/0072979 | A1 | 3/2020 | Boloorian et al. |
| 2020/0076152 | A1 | 3/2020 | Eichenholz et al. |
| 2020/0088876 | A1 | 3/2020 | Tanemura et al. |
| 2020/0103501 | A1 | 4/2020 | Kotelnikov et al. |
| 2020/0104647 | A1 | 4/2020 | Pirim |
| 2020/0110179 | A1 | 4/2020 | Talty et al. |
| 2020/0116837 | A1 | 4/2020 | Asghari et al. |
| 2020/0116842 | A1 | 4/2020 | Asghari et al. |
| 2020/0116849 | A1 | 4/2020 | Wennersten et al. |
| 2020/0116863 | A1 | 4/2020 | Jensen et al. |
| 2020/0124711 | A1 | 4/2020 | Rezk et al. |
| 2020/0132843 | A1 | 4/2020 | Hart et al. |
| 2020/0132849 | A1 | 4/2020 | Moebius et al. |
| 2020/0142065 | A1 | 5/2020 | Boloorian et al. |
| 2020/0142066 | A1 | 5/2020 | Sandborn et al. |
| 2020/0142068 | A1 | 5/2020 | Crouch et al. |
| 2020/0150241 | A1 | 5/2020 | Byrnes et al. |
| 2020/0158830 | A1 | 5/2020 | Asghari et al. |
| 2020/0158833 | A1 | 5/2020 | Baba et al. |
| 2020/0158839 | A1 | 5/2020 | Lin et al. |
| 2020/0166617 | A1 | 5/2020 | Crouch et al. |
| 2020/0166647 | A1 | 5/2020 | Crouch et al. |
| 2020/0174095 | A1 | 6/2020 | Altintas et al. |
| 2020/0182973 | A1 | 6/2020 | Luff et al. |
| 2020/0182978 | A1 | 6/2020 | Maleki et al. |
| 2020/0200879 | A1 | 6/2020 | Halstig et al. |
| 2020/0209366 | A1 | 7/2020 | Maleki |
| 2020/0225332 | A1 | 7/2020 | Wagner et al. |
| 2020/0226769 | A1 | 7/2020 | Das et al. |
| 2020/0241119 | A1 | 7/2020 | Asghari et al. |
| 2020/0249324 | A1 | 8/2020 | Steinberg et al. |
| 2020/0249350 | A1 | 8/2020 | Schmalenberg |
| 2020/0256956 | A1 | 8/2020 | Luff et al. |
| 2020/0278432 | A1 | 9/2020 | Thorpe et al. |
| 2020/0284879 | A1 | 9/2020 | Asghari et al. |
| 2020/0284883 | A1 | 9/2020 | Ferreira et al. |
| 2020/0284913 | A1 | 9/2020 | Amelot et al. |
| 2020/0292706 | A1 | 9/2020 | Hexsel et al. |
| 2020/0295537 | A1 | 9/2020 | Zilkie |
| 2020/0300980 | A1 | 9/2020 | Behzadi et al. |
| 2020/0300993 | A1 | 9/2020 | Behzadi et al. |
| 2020/0301070 | A1 | 9/2020 | Nagarajan |
| 2020/0309949 | A1 | 10/2020 | Feng et al. |
| 2020/0309952 | A1 | 10/2020 | Imaki et al. |
| 2020/0319314 | A1 | 10/2020 | Behzadi et al. |
| 2020/0319409 | A1 | 10/2020 | Su et al. |
| 2020/0326476 | A1 | 10/2020 | Hiratani |
| 2020/0333441 | A1 | 10/2020 | Diaz |
| 2020/0333443 | A1* | 10/2020 | Boloorian ............... G06F 17/14 |
| 2020/0333533 | A1 | 10/2020 | Rogers et al. |
| 2020/0363515 | A1 | 11/2020 | Luff et al. |
| 2020/0373662 | A1 | 11/2020 | Gleason et al. |
| 2020/0379112 | A1 | 12/2020 | Ujhara et al. |
| 2020/0379115 | A1 | 12/2020 | Yang et al. |
| 2020/0400821 | A1 | 12/2020 | Baker et al. |
| 2020/0400822 | A1 | 12/2020 | Ando et al. |
| 2020/0408911 | A1* | 12/2020 | Boloorian ............... G01S 17/58 |
| 2020/0408912 | A1 | 12/2020 | Boloorian et al. |
| 2021/0010802 | A1 | 1/2021 | Onohara et al. |
| 2021/0033732 | A1 | 2/2021 | Boloorian et al. |
| 2021/0055388 | A1 | 2/2021 | Feng et al. |
| 2021/0063541 | A1 | 3/2021 | Zheng et al. |
| 2021/0063542 | A1 | 3/2021 | Zheng et al. |
| 2021/0072385 | A1 | 3/2021 | Sandborn et al. |
| 2021/0072389 | A1* | 3/2021 | Boloorian ............... G01S 17/34 |
| 2021/0072445 | A1 | 3/2021 | Kurokawa et al. |
| 2021/0088657 | A1 | 3/2021 | Shah et al. |
| 2021/0096228 | A1 | 4/2021 | Behzadi et al. |
| 2021/0109195 | A1 | 4/2021 | Feng et al. |
| 2021/0116778 | A1 | 4/2021 | Zhang et al. |
| 2021/0132232 | A1 | 5/2021 | Asghari et al. |
| 2021/0141058 | A1 | 5/2021 | Piggott et al. |
| 2021/0149056 | A1 | 5/2021 | Luff et al. |
| 2021/0156997 | A1 | 5/2021 | Weinert et al. |
| 2021/0156999 | A1 | 5/2021 | Nishino et al. |
| 2021/0159659 | A1 | 5/2021 | Bandyopadhyay et al. |
| 2021/0159664 | A1 | 5/2021 | Liu et al. |
| 2021/0165102 | A1 | 6/2021 | Crouch et al. |
| 2021/0173058 | A1 | 6/2021 | Viswanatha et al. |
| 2021/0181320 | A1 | 6/2021 | Oza et al. |
| 2021/0190907 | A1 | 6/2021 | Sahara |
| 2021/0190921 | A1 | 6/2021 | Golikov et al. |

(56) References Cited

U.S. PATENT DOCUMENTS

| | | | |
|---|---|---|---|
| 2021/0190925 | A1 | 6/2021 | Asghari et al. |
| 2021/0199797 | A1 | 7/2021 | Choi et al. |
| 2021/0231805 | A1 | 7/2021 | Dehlinger et al. |
| 2021/0239811 | A1 | 8/2021 | Asghari et al. |
| 2021/0255324 | A1 | 8/2021 | Dunn et al. |
| 2021/0278540 | A1 | 9/2021 | Maayan et al. |
| 2021/0293923 | A1 | 9/2021 | Arkind et al. |
| 2021/0293934 | A1 | 9/2021 | Sun et al. |
| 2021/0311194 | A1* | 10/2021 | Boloorian ............. G01S 17/894 |
| 2021/0316756 | A1 | 10/2021 | Davydenko |
| 2021/0318436 | A1 | 10/2021 | Boloorian et al. |
| 2021/0318442 | A1 | 10/2021 | Hosseini et al. |
| 2021/0325520 | A1 | 10/2021 | Cai et al. |
| 2021/0333386 | A1 | 10/2021 | Park et al. |
| 2021/0341611 | A1* | 11/2021 | Boloorian ............... G01S 17/58 |
| 2021/0349196 | A1 | 11/2021 | Wang et al. |
| 2021/0349216 | A1 | 11/2021 | Behroozpour et al. |
| 2021/0356592 | A1 | 11/2021 | Behroozpour |
| 2021/0364607 | A1 | 11/2021 | Davydenko |
| 2021/0373137 | A1 | 12/2021 | Tan et al. |
| 2021/0373162 | A1 | 12/2021 | Wu et al. |
| 2021/0389244 | A1 | 12/2021 | Bowman et al. |
| 2021/0396879 | A1 | 12/2021 | Sun et al. |
| 2021/0405194 | A1 | 12/2021 | Tsuchida |
| 2022/0003842 | A1 | 1/2022 | Wang et al. |
| 2022/0006260 | A1 | 1/2022 | Lipson et al. |
| 2022/0043151 | A1 | 2/2022 | Baker et al. |
| 2022/0050187 | A1 | 2/2022 | Yao |
| 2022/0065999 | A1 | 3/2022 | Phare et al. |
| 2022/0066017 | A1 | 3/2022 | Gipson |
| 2022/0075121 | A1 | 3/2022 | Lowder et al. |
| 2022/0082696 | A1 | 3/2022 | Kjellman et al. |
| 2022/0085567 | A1 | 3/2022 | Lowder et al. |
| 2022/0099837 | A1 | 3/2022 | Crouch et al. |
| 2022/0107411 | A1 | 4/2022 | Koonath et al. |
| 2022/0113390 | A1 | 4/2022 | Koonath et al. |
| 2022/0113422 | A1 | 4/2022 | Hillard et al. |
| 2022/0121080 | A1 | 4/2022 | Yao |
| 2022/0179055 | A1 | 6/2022 | Ferrara et al. |
| 2022/0187457 | A1 | 6/2022 | Daami et al. |
| 2022/0187458 | A1 | 6/2022 | Piggott et al. |
| 2022/0187463 | A1 | 6/2022 | Maheshwari et al. |
| 2022/0196814 | A1 | 6/2022 | Lin et al. |
| 2022/0206164 | A1 | 6/2022 | Takada |
| 2022/0244360 | A1 | 8/2022 | Phare et al. |
| 2022/0283389 | A1 | 9/2022 | Yang et al. |
| 2022/0291361 | A1 | 9/2022 | Asghari et al. |
| 2022/0308192 | A1 | 9/2022 | John et al. |
| 2022/0334225 | A1 | 10/2022 | Davydenko et al. |
| 2022/0342048 | A1 | 10/2022 | Asghari et al. |
| 2022/0342078 | A1 | 10/2022 | Rakuljic et al. |
| 2022/0365214 | A1 | 11/2022 | Sandborn et al. |
| 2022/0373667 | A1 | 11/2022 | Khatana et al. |
| 2022/0373739 | A1 | 11/2022 | Abril et al. |
| 2022/0404470 | A1 | 12/2022 | Asghari et al. |
| 2022/0413100 | A1 | 12/2022 | Jain |
| 2022/0413143 | A1 | 12/2022 | Parsa et al. |
| 2023/0027271 | A1 | 1/2023 | Jin et al. |
| 2023/0069201 | A1 | 3/2023 | Asghari et al. |
| 2023/0104453 | A1 | 4/2023 | Asghari et al. |
| 2023/0194952 | A1 | 6/2023 | Muranaka et al. |
| 2023/0228878 | A1 | 7/2023 | Asghari et al. |
| 2023/0258861 | A1 | 8/2023 | Vercruysse et al. |
| 2023/0266466 | A1 | 8/2023 | Ummethala et al. |
| 2023/0288566 | A1 | 9/2023 | Nadkarni et al. |
| 2023/0296732 | A1 | 9/2023 | Xiao |
| 2024/0012112 | A1 | 1/2024 | Warke et al. |
| 2024/0012147 | A1 | 1/2024 | Tavallaee et al. |
| 2024/0255618 | A1 | 8/2024 | Asghari et al. |
| 2025/0085401 | A1 | 3/2025 | Zhou et al. |
| 2025/0094380 | A1 | 3/2025 | Mazed |
| 2025/0130316 | A1 | 4/2025 | Asghari et al. |

FOREIGN PATENT DOCUMENTS

| | | | |
|---|---|---|---|
| CN | 101258420 | A | 9/2008 |
| CN | 101356450 | A | 1/2009 |
| CN | 102565788 | A | 7/2012 |
| CN | 103874945 | A | 6/2014 |
| CN | 104135305 | A | 11/2014 |
| CN | 104459881 | A | 3/2015 |
| CN | 104466640 | A | 3/2015 |
| CN | 204479750 | U | 7/2015 |
| CN | 105589074 | A | 5/2016 |
| CN | 105680320 | A | 6/2016 |
| CN | 105917257 | A | 8/2016 |
| CN | 106062583 | A | 10/2016 |
| CN | 106154248 | A | 11/2016 |
| CN | 106410607 | A | 2/2017 |
| CN | 106773028 | A | 5/2017 |
| CN | 106842232 | A | 6/2017 |
| CN | 106959439 | A | 7/2017 |
| CN | 107144847 | A | 9/2017 |
| CN | 107305184 | A | 10/2017 |
| CN | 107367734 | A | 11/2017 |
| CN | 107923976 | A | 4/2018 |
| CN | 107976666 | A | 5/2018 |
| CN | 108139465 | A | 6/2018 |
| CN | 108291970 | A | 7/2018 |
| CN | 108603758 | A | 9/2018 |
| CN | 108761398 | A | 11/2018 |
| CN | 109254296 | A | 1/2019 |
| CN | 109471129 | A | 3/2019 |
| CN | 109642952 | A | 4/2019 |
| CN | 110036276 | A | 7/2019 |
| CN | 107192355 | B | 8/2019 |
| CN | 110161516 | A | 8/2019 |
| CN | 110187350 | A | 8/2019 |
| CN | 110412685 | A | 11/2019 |
| CN | 110806579 | A | 2/2020 |
| CN | 111007533 | A | 4/2020 |
| CN | 111338025 | A | 6/2020 |
| CN | 112241014 | A | 1/2021 |
| CN | 114419152 | A | 4/2022 |
| CN | 110764074 | B | 6/2022 |
| DE | 10 2015 222061 | A1 | 5/2017 |
| DE | 10 2017 200795 | A1 | 7/2018 |
| DE | 102018101935 | A1 | 8/2018 |
| DE | 10 2017 106 226 | A1 | 9/2018 |
| DE | 102019124598 | A1 | 3/2020 |
| EP | 0 523 921 | A1 | 1/1993 |
| EP | 2796890 | A1 | 10/2014 |
| EP | 2955542 | B1 | 4/2017 |
| EP | 3276371 | A1 | 1/2018 |
| EP | 3339924 | A1 | 6/2018 |
| EP | 3259615 | B1 | 11/2019 |
| EP | 3719537 | A1 | 10/2020 |
| EP | 3 584 893 | B1 | 6/2021 |
| EP | 3889644 | A1 | 10/2021 |
| GB | 1 585 053 | A | 2/1981 |
| GB | 2173664 | A | 10/1986 |
| GB | 2586499 | A | 2/2021 |
| JP | S53-123004 | A | 10/1978 |
| JP | H05-158096 | A | 6/1993 |
| JP | H07-5261 | A | 1/1995 |
| JP | H07-89147 | B2 | 9/1995 |
| JP | H09-33872 | A | 2/1997 |
| JP | H1010227 | A | 1/1998 |
| JP | 2003224321 | A | 8/2003 |
| JP | 2004-151022 | A | 5/2004 |
| JP | 2007064803 | A | 3/2007 |
| JP | 2007184511 | A | 7/2007 |
| JP | 2008160130 | A | 7/2008 |
| JP | 2008292370 | A | 12/2008 |
| JP | 2009-115696 | A | 5/2009 |
| JP | 2010151806 | A | 7/2010 |
| JP | 2010271624 | A | 12/2010 |
| JP | 2012146787 | A | 8/2012 |
| JP | 2013165407 | A | 8/2013 |
| JP | 2014202716 | A | 10/2014 |
| JP | 2015-018640 | A | 1/2015 |
| JP | 2015092184 | A | 5/2015 |

(56) References Cited

FOREIGN PATENT DOCUMENTS

| | | | |
|---|---|---|---|
| JP | 2015-517094 | A | 6/2015 |
| JP | 2015172540 | A | 10/2015 |
| JP | 2015180735 | A | 10/2015 |
| JP | 2015230259 | A | 12/2015 |
| JP | 2016111087 | A | 6/2016 |
| JP | 2016-525209 | A | 8/2016 |
| JP | 5975203 | B2 | 8/2016 |
| JP | 2017502315 | A | 1/2017 |
| JP | 2017097340 | A | 6/2017 |
| JP | 2017106897 | A | 6/2017 |
| JP | 2017524918 | A | 8/2017 |
| JP | 2017161484 | A | 9/2017 |
| JP | 2017-198514 | A | 11/2017 |
| JP | 2017-211348 | A | 11/2017 |
| JP | 2018511054 | A | 4/2018 |
| JP | 2018-512600 | A | 5/2018 |
| JP | 2018520346 | A | 7/2018 |
| JP | 2018529955 | A | 10/2018 |
| JP | 2018188284 | A | 11/2018 |
| JP | 2018200273 | A | 12/2018 |
| JP | 2019502925 | A | 1/2019 |
| JP | 2019095218 | A | 6/2019 |
| JP | 2019525195 | A | 9/2019 |
| JP | 2019-203977 | A | 11/2019 |
| JP | 2019-537012 | A | 12/2019 |
| JP | 2020-012641 | A | 1/2020 |
| JP | 2020-16639 | A | 1/2020 |
| JP | 2020-34546 | A | 3/2020 |
| JP | 2002090457 | A | 3/2020 |
| JP | 2020085723 | A | 6/2020 |
| JP | 2021004800 | A | 1/2021 |
| JP | 2021032848 | A | 3/2021 |
| JP | 7397009 | B2 | 12/2023 |
| KR | 20060086182 | A | 7/2006 |
| KR | 10-2015-0045735 | A | 4/2015 |
| KR | 20180013598 | A | 2/2018 |
| KR | 101 931 022 | B1 | 12/2018 |
| WO | 97/11396 | A1 | 3/1997 |
| WO | 2010123182 | A1 | 10/2010 |
| WO | 2010127151 | A1 | 11/2010 |
| WO | 2012123668 | A1 | 9/2012 |
| WO | 2012153309 | A2 | 11/2012 |
| WO | 2013/049579 | A1 | 4/2013 |
| WO | 2014/203654 | A1 | 12/2014 |
| WO | 2014/206630 | A1 | 12/2014 |
| WO | 2015/044370 | A1 | 4/2015 |
| WO | 2015/058209 | A1 | 4/2015 |
| WO | 2015/098027 | A1 | 7/2015 |
| WO | 2015/200800 | A1 | 12/2015 |
| WO | 2016/024332 | A1 | 2/2016 |
| WO | 2016/097409 | A2 | 6/2016 |
| WO | 2017/023107 | A1 | 2/2017 |
| WO | 2017/083597 | A1 | 5/2017 |
| WO | 2017/095817 | A1 | 6/2017 |
| WO | 2017/102156 | A1 | 6/2017 |
| WO | 2017/187510 | A1 | 11/2017 |
| WO | 2017/216581 | A1 | 12/2017 |
| WO | 2018/003852 | A1 | 1/2018 |
| WO | 2018/036946 | A1 | 3/2018 |
| WO | 2018/060318 | A1 | 4/2018 |
| WO | 2018/116412 | A1 | 6/2018 |
| WO | 2018/160240 | A2 | 9/2018 |
| WO | 2018/170478 | A1 | 9/2018 |
| WO | 2018/230474 | A1 | 12/2018 |
| WO | 2019/010320 | A1 | 1/2019 |
| WO | 2019/018894 | A1 | 1/2019 |
| WO | 2019/121069 | A1 | 6/2019 |
| WO | 2019/130472 | A1 | 7/2019 |
| WO | 2019/149815 | A1 | 8/2019 |
| WO | 2019/196135 | A1 | 10/2019 |
| WO | 2019/217761 | A1 | 11/2019 |
| WO | 2019/217857 | A1 | 11/2019 |
| WO | 2019/236430 | A1 | 12/2019 |
| WO | 2019/236464 | A1 | 12/2019 |
| WO | 2020/005537 | A1 | 1/2020 |
| WO | 2020/033161 | A1 | 2/2020 |
| WO | 2020/046513 | A1 | 3/2020 |
| WO | 2020/076566 | A1 | 4/2020 |
| WO | 2020/110779 | A1 | 6/2020 |
| WO | 2020/129284 | A1 | 6/2020 |
| WO | 2020/167515 | A1 | 8/2020 |
| WO | 2020/190491 | A1 | 9/2020 |
| WO | 2020/205450 | A1 | 10/2020 |
| WO | 2020/234797 | A1 | 11/2020 |
| WO | 2020/251633 | A1 | 12/2020 |
| WO | 2021/024038 | A1 | 2/2021 |
| WO | 2021/252894 | A1 | 12/2021 |
| WO | 2022/013422 | A1 | 1/2022 |
| WO | 2022/233503 | A1 | 11/2022 |
| WO | 2023/006470 | A1 | 2/2023 |
| WO | 2023/118295 | A1 | 6/2023 |

OTHER PUBLICATIONS

Schulmeister, Karl, "White Paper The new edition of the international laser product safety standard", IEC 60825-1, 2014.

Self, "Focusing of spherical Gaussian beams", Applied Optics, Mar. 1, 1983, vol. 22, No. 5, pp. 658-661.

Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.

Smit, Meint K. C. v., "Phasar-Based WDM-Devices: Principles, Design and Applications", IEEE Journal of Selected Topics in Quantum Electronics, Jan. 1, 1996, 2(2), 236-250.

Soref, Richard A. et al. "Electrooptical Effects in Silicon", IEEE Journal of Quantum Electronics, vol. QE-23, No. 1, Jan. 1987, pp. 123-129.

Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.

Sun, J., et al., "Large-scale silicon photonic circuits for optical phased arrays," vol. 20, No. 4, Jul./Aug. 2014. IEEE Journal of Selected Topics in Quantum Electronics.

Tang, Xiaofan, International Preliminary Report on Patentability and Written Opinion, PCT/US2024/010607, The International Bureau of WIPO, Aug. 21, 2025.

"The Demultiplexer" accessed from www.electronics-tutorials.ws/combination/comb_3.html with WayBack Machine dated Feb. 9, 2008, 2 pages.

Van Acoleyen et al., "Off-chip beam steering with a one-dimensional optical phased array on silicon-on-insulator", Apr. 2009, Opt. Lett., 34(9) 1477-1479.

Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.

Vasilyev, A. et al., "The Optoelectronic Swept-Frequency Laser and Its Applications in Ranging, Three-Dimensional Imaging, and Coherent Beam Combining of Chirped-Seed Amplifiers," CaltechTHESIS, May 20, 2013, 177 pages.

Velodyne, "HDL-64E S2 Datasheet. Retrieved from http://velodynelidar.com/lidar/products/brochure/HDL-64E%20S2%20datasheet_2010_lowres.pdf", 2017.

Wang et al., "Automotive FMCW Radar-enhanced Range Estimation via a Local Resampling Fourier Transform", International Journal of Advanced Robotic Systems, May 15, 2016, pp. 1-8.

Wikipedia, Optical Attenuator, 2022, 3 pages.

Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.

Wojtkiewicz et al., "Two-dimensional signal processing in FMCW radars", National Conference on Circuit Theory and Electronic Networks, vol. 2, Oct. 1997, pp. 1-6.

Xu et al., "Methods and applications of on-chip beam splitting: A review", Frontiers in Physics, Sep. 6, 2022, 16 pages.

Yao et al., "Non-mechanical Lidar beamforming enabled by combined wavelength-division- and time-division-multiplexing", Avail-

(56) References Cited

OTHER PUBLICATIONS able at SSRN.com, Oct. 5, 2022, 13 pages, https://ssrn.com/abstract=4238741 or http://dx.doi.org/10.2139/ssrn.4238741.
Zhu et al., "Dual-Comb Ranging", Engineering, 4, Oct. 16, 2018, pp. 772-778.
Aalto, Timo Eta L., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.
Amzajerdian et al., "Demonstration of Coherent Doppler Lidar for Navigation in GPS-Denied Environments", Laser Radar Technology and Applications XXII, SPIE Defense and Security, Apr. 9-13, 2017, vol. 10191, 1019102.
Anderson et al., "ladar: Frequency-Modulated Continuous Wave Laser Detection AND Ranging", Photogrammetric Engineering & Remote Sensing, vol. 83, No. 11, Nov. 2017.
Baghmisheh, B. B., "Chip-scale Lidar", Jan. 19, 2017, Electrical Engineering and Computer Sciences University of California, Berkeley.
Banzhaf et al., "Phase-Coded FMCW Lidar", 2021 29th European Signal Processing Conference (EUSIPCO), EURASIP, Aug. 23, 2021, XX034038479, pp. 1775-1779, retrieved on Nov. 15, 2021.
Behroozpour et al., "Electronic-Photonic Integrated Circulator 3D Microimaging", IEEE Journal of Solid-State Circuits, Jan. 2017, vol. 52, No. 1, pp. 161-172.
Behroozpour, B. et al., "Lidar System Architectures and Circuits," IEEE Communications Magazine, Oct. 2017, pp. 135-142.
Carter et al., "Lidar 101: An Introduction to Lidar Technology, Data, and Applications", Nov. 2012, NOAA Coastal Services Center, 76 pages.
Chan, M.K, "Atmospheric transmission windows for high energy short pulse lasers", Thesis, Naval Postgraduate School, Dec. 2003.
Chang et al., "A review of UAV autonomous navigation in GPS-denied environments", Robots and Autonomous Systems, Dec. 2023, 170, 104533, 23 pages.
Conditional Euclidean Clustering, retrieved on Jul. 9, 2022 from https://pcl.readthedocs.io/projects/tutorials/en/latest/cluster_extraction.html#cluster-extraction.
Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.
Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.
Doylend, J. K., "Two-dimensional free-space beam steering with an optical phased array on silicon-on-insulator", Oct. 1, 2011, Optics Express, 19(22), 21595-2160.
Ellis, Jonathan D., "Field Guide to Displacement Measuring Interferometry", SPIE Field Guides, vol. FG30, Jan. 7, 2014, 155 pages.
Euclidean Cluster Extraction, retrieved on Jul. 9, 2022 from https://pcl.readthedocs.io/projects/tutorials/en/latest/conditional_euclidean_clustering.html.
Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.
Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.
Goodman, J., "Speckle Phenomena in Optics Theory and Applications", Roberts and Company, Sep. 28, 2007, 130(2), pp. 413-414.
Gulati, et al., "A Low-Power Reconfigurable Analog-to-Digital Converter", IEEE Journal of Solid-State Circuits, Dec. 2001, vol. 36, No. 12, pp. 1900-1911.
Guo et al., "Beat-frequency adjustable Er3+-doped DBR fiber laser for ultrasound detection", Optics Express, Jan. 31, 2011, vol. 19, No. 3, pp. 2485-2492.
Haran, T., "Short-wave infrared diffuse reflectance of Textile Materials", Thesis, Georgia State University, 2008.
Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.
Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.
Ince et al., "An S-band frequency-modulated continuous-wave boundary layer profiler: Description and initial results", Radio Science, Aug. 5, 2003, vol. 38, Issue 4, 1072, 10 pages.
Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.
Kaasalainen, S., "The multispectral journey of Lidar", Retrieved from GIM International: https://www.gim-international.com/content/article/the-multispectral-journey-of-lidar, Jan. 24, 2019.
Kelly et al., "Discrete mode laser diodes with ultra narrow linewidthe emission" Feb. 2007, Electronics Letters, vol. 43, 2 pgs.
Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.
Komljenovic et al., "Widely-Tunable Ring-Resonator Semiconductor Lasers", Review, Jul. 17, 2017, 21 pages.
Kotthaus, S., et al., "Derivation of an urban materials spectral library through emittance and reflectance spectroscopy", ISPRS Journal of Photogrammetry and Remote Sensing, Aug. 2014, vol. 94, 194-212.
Kumar et al., "Intra-data center interconnects, networking, and architectures", Coherent Detection, Optical Fiber Telecommunications VII, Oct. 25, 2019, Science Direct, pp. 627-672.
Li, L., "Time-of-Flight Camera—An Introduction", 2014, TI Technical White Paper, SLOA190B.
Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.
LiDAR vs RADAR: https://4sense.medium.com/lidar-vs-radar-312119b9eac4, 2022, 17 pages.
Lu, Z., "Silicon Photonic Switches for Optical Communication Applications", PhD Thesis. University of British Columbia, Sep. 29, 2017, 165 pages.
Nevlacsil et al., "Multi-channel swept source optical coherence tomography concept based on photonic integrated circuits", Optics Express, Oct. 26, 2020, vol. 28, No. 22, pp. 32468-32482.
PDB450C—Switchable Gain Balanced Amp. Photodetector, InGaAs. (n.d.). Retrieved from Thorlabs: https://www.thorlabs.com/thorproduct.cfm?partnumber=PDB450C.
Pfennigbauer, M. et al., "Multi-Wavelength Airborne Laser Scanning", ILMF 2011. New Orleans, Feb. 7-9, 2011.
PI Motion/Positioning, 2018, Retrieved from PI USA: http://www.pi-usa.us/products/PDF_Data/Q-522_Mini_Positioning_Stage_20150203.pdf.
PI USA: Fast Tip/Tilt Platform, 2018, Retrieved from PI USA Active Optics: http://www.pi-usa.us/products/PDF_Data/S335_Fast_Tip-Tilt_Platform.pdf.
Pierrottet et al., "Linear FMCW Laser Radar for Precision Range and Vector Velocity Measurements", MRS Online Proceeding Library Archive, Jan. 2008, pp. 1-9.
Pilot Photonics, Lyra OCS 1000, Optical comb laser module, Retrieved on Nov. 20, 2019 from Pilot Photonics: http://www.pilotphotonics.com/optical-frequency-comb-source/.
Poulton, C. V. MSC Thesis, "Integrated LIDAR with Optical Phased Arrays in Silicon Photonics", Massachusetts Institute of Technology, Sep. 2016, pp. 95-101.
Poulton, Christopher V. et al., "Coherent Solid-State LIDAR with Silicon Photonic Optical Phased Arrays", pp. 4091-4094, Oct. 15, 2017, Optics Letters, vol. 42, No. 20.
Rablau, "LIDAR—A new (self-driving) vehicle for introducing optics to broader engineering and non-engineering audiences", in Fifteenth Conference on Education and Training in Optics and

(56) References Cited

OTHER PUBLICATIONS

Photonics 2019, May 21-24, 2019, Quebec City, Quebec, Optica Publishing Group 2019, Paper 11143_138 (14 pages).
Royo et al., "An Overview of LIDAR Imaging Systems for Autonomous Vehicles", Appl. Sci., Sep. 30, 2019, 9(19):4093, 37 pages. https://doi.org/10.3390/app9194093.
Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.
Sandborn, Phillip Alan McGinnis, "FMCW Lidar: Scaling to the Chip-Level and Improving Phase-Noise-Limited Performance", Fall 2017, 18 pages.
Satyan, N. et al, "Precise control of broadband frequency chirps using optoelectronic feedback," Optics Express, Aug. 31, 2009, vol. 17, No. 18, pp. 15991-15999.

* cited by examiner

DATA REFINEMENT IN OPTICAL SYSTEMS

FIELD

The invention relates to imaging systems. In particular, the invention relates to data refinement in imaging systems.

BACKGROUND

LIDAR systems output a system output signal that is reflected by objects located outside of the LIDAR system. The reflected light returns to the LIDAR system as a system return signal. The LIDAR system includes electronics that use the system return signal to determine LIDAR data (radial velocity and/or distance between the LIDAR system and the objects) for sample regions that are illuminated by the system output signal.

In order for a LIDAR system to generate an image of a scene, the system output signal is scanned across the scene. During the scan, the LIDAR data is generated for multiple different sample regions within the scene. Each of the sample regions is illuminated for a regional time period in order to generate the LIDAR data for the sample region. However, the scanning of the system output signal continues during the regional time period. As a result, the system output signal can illuminate one object at the start of a regional time period and then move so the system output signal illuminates another object before the regional time period has expired. Changing the object that is illuminated during a regional time period is a source of errors in the LIDAR data. As a result, there is a need for LIDAR systems that can provide more reliable LIDAR data.

SUMMARY

Operating a LIDAR system includes transmitting a system output signal from the LIDAR system such that a sample region is illuminated by the system output signal. During illumination of the sample region, the system output signal includes a check data period and multiple subject data periods. A frequency of the system output signal changes at different rates during the subject data periods. Light that returns to the LIDAR system from the system output signal is combined with light from a reference signal so as to generate a beating signal beating at a beat frequency. The reference signal includes light that has not exited from the LIDAR system. A comparative beat frequency is calculated. The comparative beat frequency approximates a value of the beat frequency of the beating signal during the check data period. Additionally, the comparative beat frequency is calculated from the beat frequencies of the beating signal during the subject data periods.

A LIDAR system is configured to output a system output signal such that a sample region is illuminated by the system output signal. During illumination of the sample region, the system output signal includes a check data period and multiple subject data periods. A frequency of the system output signal changes at different rates during the subject data periods. The LIDAR system includes a light-combining component that combines light that returns to the LIDAR system from the system output signal with light from a reference signal so as to generate a beating signal beating at a beat frequency. The reference signal includes light that has not exited from the LIDAR system. The system also includes electronics configured to calculate a comparative beat frequency that approximates a value of the beat frequency of the beating signal during the check data period.

The comparative beat frequency is calculated from the beat frequencies of the beating signal during the subject data periods.

DESCRIPTION

Figure 1A:
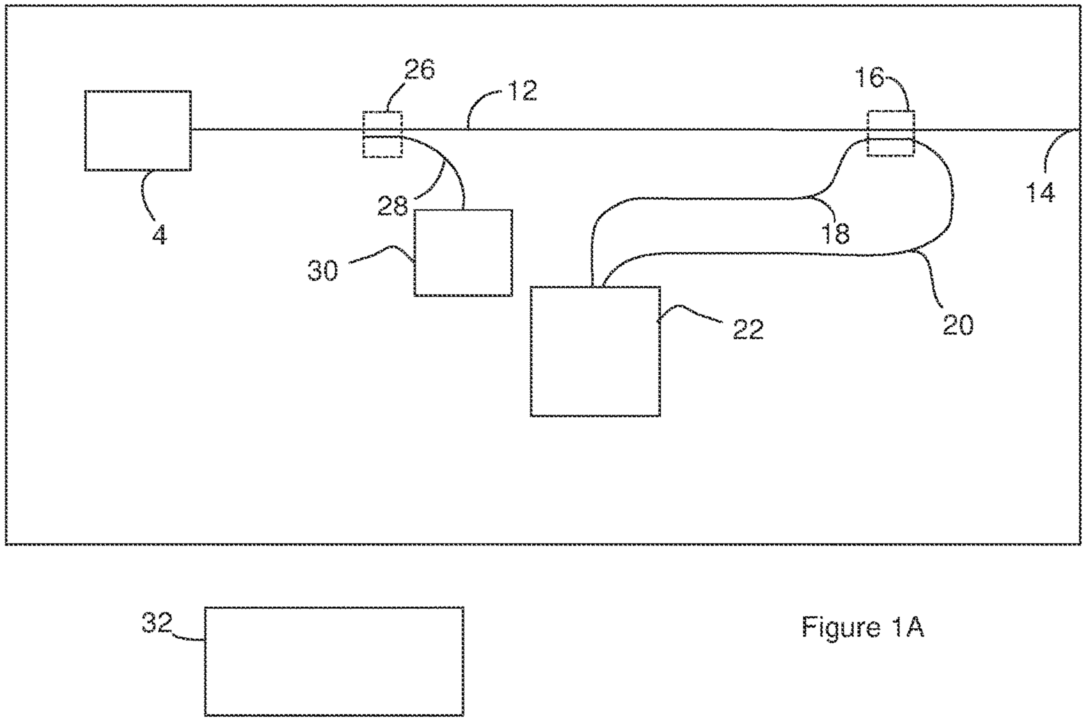
FIG. 1A is a topview of a schematic of a LIDAR system that includes or consists of a LIDAR chip that outputs a LIDAR output signal and receives a LIDAR input signal on a common waveguide.

A LIDAR system outputs a system output signal. The frequency of the system output signal changes in a series of repeated cycles. Each of the cycles includes a check data period and multiple subject data periods. A light-combining component combines light that returns to the LIDAR system from the system output signal with light from a reference signal so as to generate a beating signal that is beating at a beat frequency. The reference signal includes light that has not exited from the LIDAR system.

Electronics can use the beat frequency of the beating signal during multiple different subject data periods to calculate candidate LIDAR data for a sample region that is illuminated by the system output signal during a subject one of the cycles. The candidate LIDAR data indicates a potential radial velocity and/or a potential distance between the LIDAR system and an object external to the LIDAR system.

The electronics can also use the beat frequency of the beating signal during multiple different subject data periods to calculate a comparative beat frequency. The comparative beat frequency approximates the value of the beat frequency of the beating signal during the check data period in the subject cycle.

The comparative beat frequency can be calculated such that when the system output signal is incident on the same surface during the subject data periods and the check data period, the value of the comparative beat frequency matches, or substantially matches, the beat frequency during the check data period. However, when the system output signal is not incident on the same surface during the subject data periods and the check data period, the comparative beat frequency and the beat frequency during the check data period do not match. For instance, the comparative beat frequency and the beat frequency during the check data period can match, or substantially match, when the candidate LIDAR data stays constant, or substantially constant, for durations of the subject and check data periods. The candidate LIDAR data staying constant through the subject and check data periods indicates that the radial velocity and/or distance between the LIDAR system and the object stayed constant through the subject and check data periods. As a result, the constant candidate LIDAR data indicates that the system output signal has remained incident on the same surface object during at least the subject data periods. Accordingly, a match, or substantial match, between the comparative beat frequency and the beat frequency during the check data period indicates that the system output signal has remained incident on the same surface of the object during at least the subject data periods.

The values of the comparative beat frequency and the beat frequency during the check data period can be compared to determine whether the system output signal has remained incident on the same surface of the object during the subject data periods. LIDAR data for the sample region can be classified as unavailable when the comparison indicates that the system output signal was not incident on the same surface during the subject data periods. In contrast, the candidate LIDAR data for the sample region can be classified as valid when the comparison indicates that the system output signal remained on the same surface during the subject data periods. As a result, the LIDAR data for the sample region can be set equal to the candidate LIDAR date for the sample region. Accordingly, LIDAR data for sample regions where the system output signal changes surfaces can be removed from the LIDAR data for the collection of sample regions within the system's field of view. As a result, the LIDAR data for the sample regions within the system's field of view can be processed with reduced interference from edge effect errors.

The above method for refining LIDAR data has also been shown to reduce other errors that occur in the generation of LIDAR data for the sample regions within a system's field of view. Outliers occur where the LIDAR data for a sample region is not consistent with the LIDAR data for surrounding sample regions. Outliers do not necessarily occur at a transition between surfaces but can occur in the middle of a surface. As a result, an outlier can be LIDAR data from a surface that is not consistent with LIDAR data at other locations on that surface. Removing candidate LIDAR data that does not remain constant or substantially constant during illumination of a sample region has been shown to reduce the presence of outliers. Aliasing will also be reduced by the extraction of these candidate LIDAR data values from the final LIDAR data values in the field of view.

FIG. 1A is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip. The LIDAR chip includes a light source 4 that outputs a preliminary outgoing LIDAR signal. A suitable light source 4 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip includes a utility waveguide 12 that receives an outgoing LIDAR signal from a light source 4. The utility waveguide 12 terminates at a facet 14 and carries the outgoing LIDAR signal to the facet 14. The facet 14 can be positioned such that the outgoing LIDAR signal traveling through the facet 14 exits the LIDAR chip and serves as a LIDAR output signal. For instance, the facet 14 can be positioned at an edge of the chip so the outgoing LIDAR signal traveling through the facet 14 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

The LIDAR output signal travels away from the LIDAR system through free space in the atmosphere in which the LIDAR system is positioned. The LIDAR output signal may be reflected by one or more objects in the path of the LIDAR output signal. When the LIDAR output signal is reflected, at least a portion of the reflected light travels back toward the LIDAR chip as a LIDAR input signal. In some instances, the LIDAR input signal can also be considered a system return signal. As an example, when the exit of the LIDAR output signal from the LIDAR chip is also an exit of the LIDAR output signal from the LIDAR system, the LIDAR input signal can also be considered a system return signal.

The LIDAR input signals can enter the utility waveguide 12 through the facet 14. The portion of the LIDAR input signal that enters the utility waveguide 12 serves as an incoming LIDAR signal. The utility waveguide 12 carries the incoming LIDAR signal to a splitter 16 that moves a portion of the outgoing LIDAR signal from the utility waveguide 12 onto a comparative waveguide 18 as a comparative signal. The comparative waveguide 18 carries the comparative signal to a processing component 22 for further processing. Although FIG. 1A illustrates a directional coupler operating as the splitter 16, other signal tapping components can be used as the splitter16. Suitable splitters 16 include, but are not limited to, directional couplers, optical couplers, y-junctions, tapered couplers, and Multi-Mode Interference (MMI) devices.

The utility waveguide 12 also carrier the outgoing LIDAR signal to the splitter 16. The splitter 16 moves a portion of the outgoing LIDAR signal from the utility waveguide 12 onto a reference waveguide 20 as a reference signal. The reference waveguide 20 carries the reference signal to the processing component 22 for further processing.

The percentage of light transferred from the utility waveguide 12 by the splitter 16 can be fixed or substantially fixed. For instance, the splitter 16 can be configured such that the power of the reference signal transferred to the reference waveguide 20 is an outgoing percentage of the power of the outgoing LIDAR signal or such that the power of the comparative signal transferred to the comparative waveguide 18 is an incoming percentage of the power of the incoming LIDAR signal. In many splitters 16, such as directional couplers and multimode interferometers (MMIs), the outgoing percentage is equal or substantially equal to the incoming percentage. In some instances, the outgoing percentage is greater than 30%, 40%, or 49% and/or less than 51%, 60%, or 70% and/or the incoming percentage is greater than 30%, 40%, or 49% and/or less than 51%, 60%, or 70%. A splitter 16 such as a multimode interferometer (MMI)

generally provides an outgoing percentage and an incoming percentage of 50% or about 50%. However, multimode interferometers (MMIs) can be easier to fabricate in platforms such as silicon-on-insulator platforms than some alternatives. In one example, the splitter 16 is a multimode interferometer (MMI) and the outgoing percentage and the incoming percentage are 50% or substantially 50%. As will be described in more detail below, the processing component 22 combines the comparative signal with the reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control branch for controlling operation of the light source 4. The control branch includes a splitter 26 that moves a portion of the outgoing LIDAR signal from the utility waveguide 12 onto a control waveguide 28. The coupled portion of the outgoing LIDAR signal serves as a tapped signal. Although FIG. 1A illustrates a directional coupler operating as the splitter 26, other signal tapping components can be used as the splitter 26. Suitable splitters 26 include, but are not limited to, directional couplers, optical couplers, y-junctions, tapered couplers, and Multi-Mode Interference (MMI) devices.

The control waveguide 28 carries the tapped signal to control components 30. The control components can be in electrical communication with electronics 32. All or a portion of the control components can be included in the electronics 32. During operation, the electronics can employ output from the control components 30 in a control loop configured to control a process variable of one, two, or three loop controlled light signals selected from the group consisting of the tapped signal, the system output signal, and the outgoing LIDAR signal. Examples of the suitable process variables include the frequency of the loop controlled light signal and/or the phase of the loop controlled light signal.

Figure 1B:
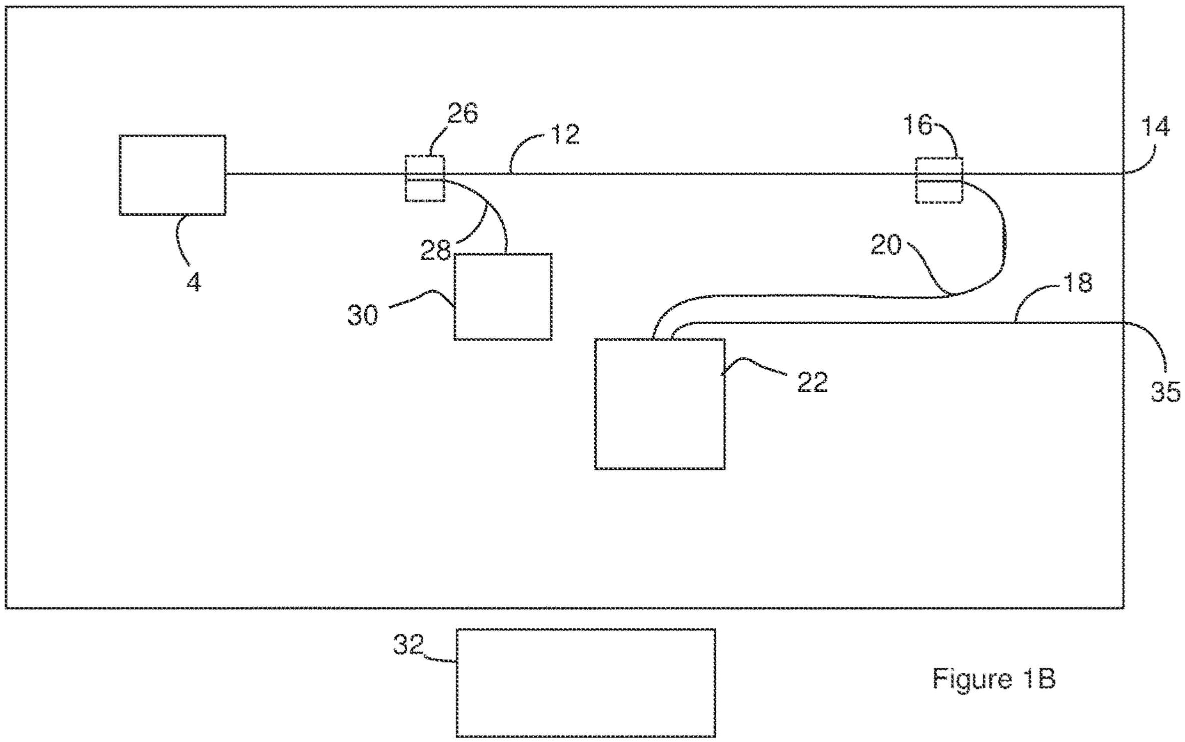
FIG. 1B is a topview of a schematic of a LIDAR system that includes or consists of a LIDAR chip that outputs a LIDAR output signal and receives a LIDAR input signal on different waveguides.

The LIDAR system can be modified so the incoming LIDAR signal and the outgoing LIDAR signal can be carried on different waveguides. For instance, FIG. 1B is a topview of the LIDAR chip of FIG. 1A modified such that the incoming LIDAR signal and the outgoing LIDAR signal are carried on different waveguides. The outgoing LIDAR signal exits the LIDAR chip through the facet 14 and serves as the LIDAR output signal. When light from the LIDAR output signal is reflected by an object external to the LIDAR system, at least a portion of the reflected light returns to the LIDAR chip as a first LIDAR input signal. The first LIDAR input signals enters the comparative waveguide 18 through a facet 35 and serves as the comparative signal. The comparative waveguide 18 carries the comparative signal to a processing component 22 for further processing. As described in the context of FIG. 1A, the reference waveguide 20 carries the reference signal to the processing component 22 for further processing. As will be described in more detail below, the processing component 22 combines the comparative signal with the reference signal to form a composite signal that carries LIDAR data for a sample region on the field of view.

Figure 1C:
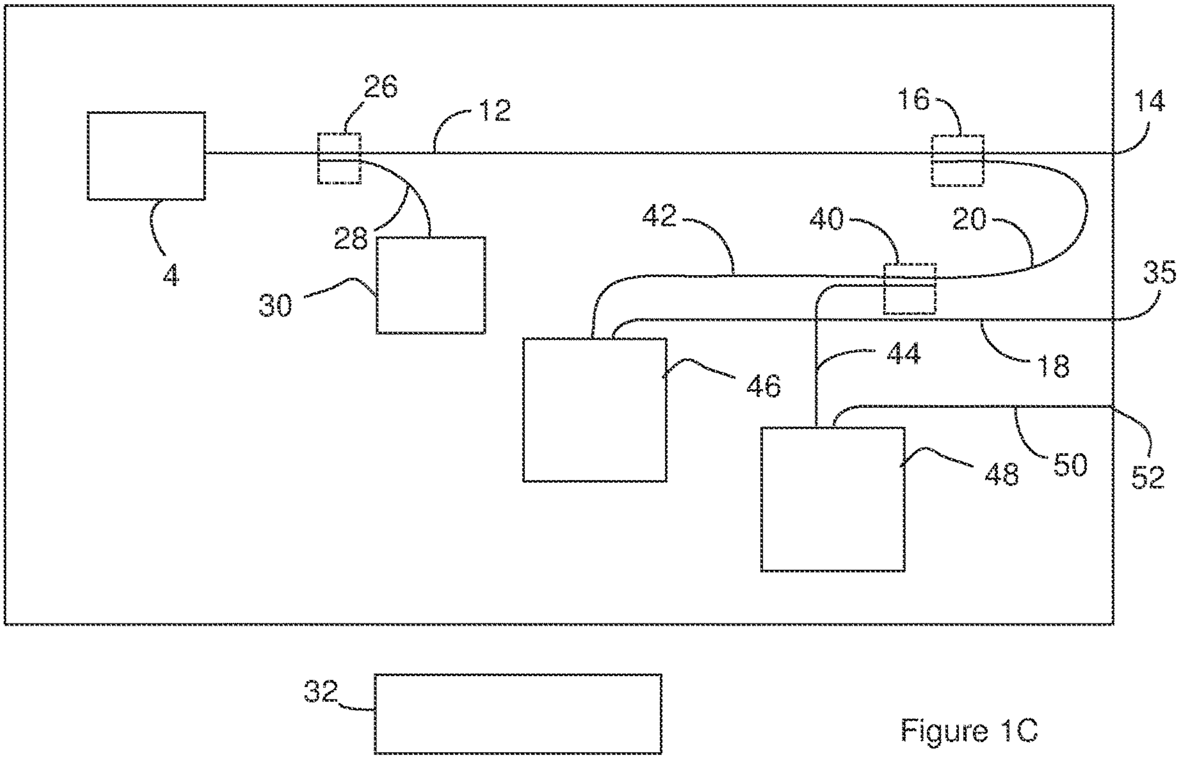
FIG. 1C is a topview of a schematic of another embodiment of a LIDAR system that that includes or consists of a LIDAR chip that outputs a LIDAR output signal and receives multiple LIDAR input signals on different waveguides.

The LIDAR chips can be modified to receive multiple LIDAR input signals. For instance, FIG. 1C illustrates the LIDAR chip of FIG. 1B modified to receive two LIDAR input signals. A splitter 40 is configured to place a portion of the reference signal carried on the reference waveguide 20 on a first reference waveguide 42 and another portion of the reference signal on a second reference waveguide 44. Accordingly, the first reference waveguide 42 carries a first reference signal and the second reference waveguide 44 carries a second reference signal. The first reference waveguide 42 carries the first reference signal to a first processing component 46 and the second reference waveguide 44 carries the second reference signal to a second processing component 48. Examples of suitable splitters 40 include, but are not limited to, y-junctions, optical couplers, and multi-mode interference couplers (MMIs).

The outgoing LIDAR signal exits the LIDAR chip through the facet 14 and serves as the LIDAR output signal. When light from the LIDAR output signal is reflected by one or more object located external to the LIDAR system, at least a portion of the reflected light returns to the LIDAR chip as a first LIDAR input signal. The first LIDAR input signals enters the comparative waveguide 18 through the facet 35 and serves as a first comparative signal. The comparative waveguide 18 carries the first comparative signal to a first processing component 46 for further processing.

Additionally, when light from the LIDAR output signal is reflected by one or more object located external to the LIDAR system, at least a portion of the reflected signal returns to the LIDAR chip as a second LIDAR input signal. The second LIDAR input signals enters a second comparative waveguide 50 through a facet 52 and serves as a second comparative signal carried by the second comparative waveguide 50. The second comparative waveguide 50 carries the second comparative signal to a second processing component 48 for further processing.

Although the light source 4 is shown as being positioned on the LIDAR chip, the light source 4 can be located off the LIDAR chip. For instance, the utility waveguide 12 can terminate at a second facet through which the outgoing LIDAR signal can enter the utility waveguide 12 from a light source 4 located off the LIDAR chip.

In some instances, a LIDAR chip constructed according to FIG. 1B or FIG. 1C is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the first LIDAR input signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view.

Figure 2:
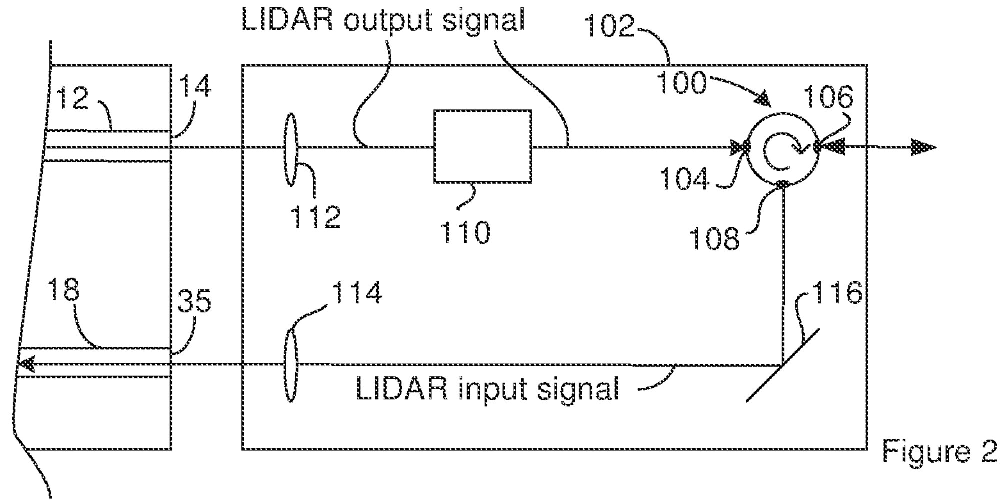
FIG. 2 is a topview of an example of a LIDAR adapter that is suitable for use with the LIDAR chip of FIG. 1B.

An example of a LIDAR adapter that is suitable for use with the LIDAR chip of FIG. 1B is illustrated in FIG. 2. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106.

The LIDAR adapter can be configured such that the output of the LIDAR output signal from the second port 106 can also serve as the output of the LIDAR output signal from the LIDAR adapter and accordingly from the LIDAR system. As a result, the LIDAR output signal can be output from the LIDAR adapter such that the LIDAR output signal is traveling toward a sample region in the field of view. Accordingly, in some instances, the portion of the LIDAR output signal that has exited from the LIDAR adapter can also be considered the system output signal. As an example, when the exit of the LIDAR output signal from the LIDAR adapter is also an exit of the LIDAR output signal from the LIDAR system, the LIDAR output signal can also be considered a system output signal.

The LIDAR output signal output from the LIDAR adapter includes, consists of, or consists essentially of light from the LIDAR output signal received from the LIDAR chip. Accordingly, the LIDAR output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter and/or the LIDAR adapter can optionally include an amplifier configured to amplify the LIDAR output signal as it travels through the LIDAR adapter.

When one or more objects in the sample region reflect the LIDAR output signal, at least a portion of the reflected light travels back to the circulator 100 as a system return signal. The system return signal enters the circulator 100 through the second port 106. FIG. 2 illustrates the LIDAR output signal and the system return signal traveling between the LIDAR adapter and the sample region along the same optical path.

The system return signal exits the circulator 100 through the third port 108 and is directed to the comparative waveguide 18 on the LIDAR chip. Accordingly, all or a portion of the system return signal can serve as the first LIDAR input signal and the first LIDAR input signal includes or consists of light from the system return signal. Accordingly, the LIDAR output signal and the first LIDAR input signal travel between the LIDAR adapter and the LIDAR chip along different optical paths.

As is evident from FIG. 2, the LIDAR adapter can include optical components in addition to the circulator 100. For instance, the LIDAR adapter can include components for directing and controlling the optical path of the LIDAR output signal and the system return signal. As an example, the adapter of FIG. 2 includes an optional amplifier 110 positioned so as to receive and amplify the LIDAR output signal before the LIDAR output signal enters the circulator 100. The amplifier 110 can be operated by the electronics 32 allowing the electronics 32 to control the power of the LIDAR output signal.

FIG. 2 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal the on the facet 35 of the comparative waveguide 18.

The LIDAR adapter can also include one or more direction changing components such as mirrors. FIG. 2 illustrates the LIDAR adapter including a mirror as a direction-changing component 116 that redirects the system return signal from the circulator 100 to the facet 20 of the comparative waveguide 18.

The LIDAR chips include one or more waveguides that constrains the optical path of one or more light signals. While the LIDAR adapter can include waveguides, the optical path that the system return signal and the LIDAR output signal travel between components on the LIDAR adapter and/or between the LIDAR chip and a component on the LIDAR adapter can be free space. For instance, the system return signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the system return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

The LIDAR system can be configured to compensate for polarization. Light from a laser source is typically linearly polarized and hence the LIDAR output signal is also typically linearly polarized. Reflection from an object may change the angle of polarization of the returned light. Accordingly, the system return signal can include light of different linear polarization states. For instance, a first portion of a system return signal can include light of a first linear polarization state and a second portion of a system return signal can include light of a second linear polarization state. The intensity of the resulting composite signals is proportional to the square of the cosine of the angle between the comparative and reference signal polarization fields. If the angle is 90 degrees, the LIDAR data can be lost in the resulting composite signal. However, the LIDAR system can be modified to compensate for changes in polarization state of the LIDAR output signal.

Figure 3:
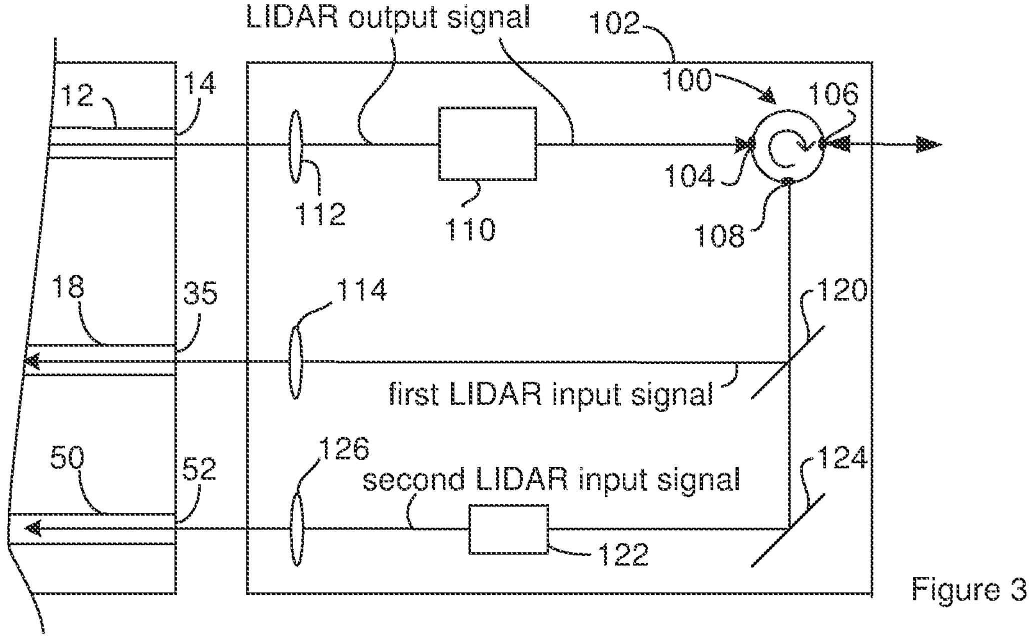
FIG. 3 is a topview of an example of a LIDAR adapter that is suitable for use with the LIDAR chip of FIG. 1C.

FIG. 3 illustrates the LIDAR system of FIG. 3 modified such that the LIDAR adapter is suitable for use with the LIDAR chip of FIG. 1C. The LIDAR adapter includes a beamsplitter 120 that receives the system return signal from the circulator 100. The beamsplitter 120 splits the system return signal into a first portion of the system return signal and a second portion of the system return signal. Suitable beamsplitters include, but are not limited to, Wollaston prisms, and MEMS-based beamsplitters.

The first portion of the system return signal is directed to the comparative waveguide 18 on the LIDAR chip and serves as the first LIDAR input signal described in the context of FIG. 1C. The second portion of the system return signal is directed a polarization rotator 122. The polarization rotator 122 outputs a second LIDAR input signal that is directed to the second input waveguide 76 on the LIDAR chip and serves as the second LIDAR input signal.

The beamsplitter 120 can be a polarizing beam splitter. One example of a polarizing beamsplitter is constructed such that the first portion of the system return signal has a first polarization state but does not have or does not substantially have a second polarization state and the second portion of the system return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can linearly polarized such that the LIDAR output signal has the first polarization state. Suitable beamsplitters include, but are not limited to, Wollaston prisms, and MEMs-based polarizing beamsplitters.

A polarization rotator can be configured to change the polarization state of the first portion of the system return signal and/or the second portion of the system return signal. For instance, the polarization rotator 122 shown in FIG. 3 can be configured to change the polarization state of the second portion of the system return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR carry light of the same polarization state, the comparative signals that result from the first LIDAR input signal have the same polarization angle as the comparative signals that result from the second LIDAR input signal.

Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multimode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 3, the first comparative signals, the second comparative signals, the first reference signals, and the second reference signals can each have light of the first polarization state.

As a result of the above configuration, first composite signals generated by the first processing component 46 and second composite signals generated by the second processing component 48 each results from combining a reference signal and a comparative signal of the same polarization state and will accordingly provide the desired beating between the reference signal and the comparative signal. For instance, the composite signal results from combining a first reference signal and a first comparative signal of the first polarization state and excludes or substantially excludes light of the second polarization state or the composite signal results from combining a first reference signal and a first comparative signal of the second polarization state and excludes or substantially excludes light of the first polarization state. Similarly, the second composite signal includes a second reference signal and a second comparative signal of the same polarization state will accordingly provide the desired beating between the reference signal and the comparative signal. For instance, the second composite signal results from combining a second reference signal and a second comparative signal of the first polarization state and excludes or substantially excludes light of the second polarization state or the second composite signal results from combining a second reference signal and a second comparative signal of the second polarization state and excludes or substantially excludes light of the first polarization state.

The above configuration results in the LIDAR data for a single sample region in the field of view being generated from multiple different composite signals (i.e. first composite signals and the second composite signal) from the sample region. In some instances, determining the LIDAR data for the sample region includes the electronics combining the LIDAR data from different composite signals (i.e. the composite signals and the second composite signal). Combining the LIDAR data can include taking an average, median, or mode of the LIDAR data generated from the different composite signals. For instance, the electronics can average the distance between the LIDAR system and the reflecting object determined from the composite signal with the distance determined from the second composite signal and/or the electronics can average the radial velocity between the LIDAR system and the reflecting object determined from the composite signal with the radial velocity determined from the second composite signal.

In some instances, determining the LIDAR data for a sample region includes the electronics identifying one or more composite signals (i.e. the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 3 is described in the context of components being arranged such that the first comparative signals, the second comparative signals, the first reference signals, and the second reference signals each have the first polarization state, other configurations of the components in FIG. 3 can arranged such that the composite signals result from combining a reference signal and a comparative signal of the same linear polarization state and the second composite signal results from combining a reference signal and a comparative signal of the same linear polarization state. For instance, the beamsplitter 120 can be constructed such that the second portion of the system return signal has the first polarization state and the first portion of the system return signal has the second polarization state, the polarization rotator receives the first portion of the system return signal, and the outgoing LIDAR signal can have the second polarization state. In this example, the first LIDAR input signal and the second LIDAR input signal each has the second polarization state.

The above system configurations result in the first portion of the system return signal and the second portion of the system return signal being directed into different composite signals. As a result, since the first portion of the system return signal and the second portion of the system return signal are each associated with a different polarization state but electronics can process each of the composite signals, the LIDAR system compensates for changes in the polarization state of the LIDAR output signal in response to reflection of the LIDAR output signal.

The LIDAR adapter of FIG. 3 can include additional optical components including passive optical components. For instance, the LIDAR adapter can include an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 52 of the second comparative waveguide 50. The LIDAR adapter also includes one or more direction changing components 124 such as mirrors and prisms. FIG. 3 illustrates the LIDAR adapter including a mirror as a direction changing component 124 that redirects the second portion of the system return signal from the circulator 100 to the facet 52 of the second comparative waveguide 50 and/or to the third lens 126.

Figure 4:
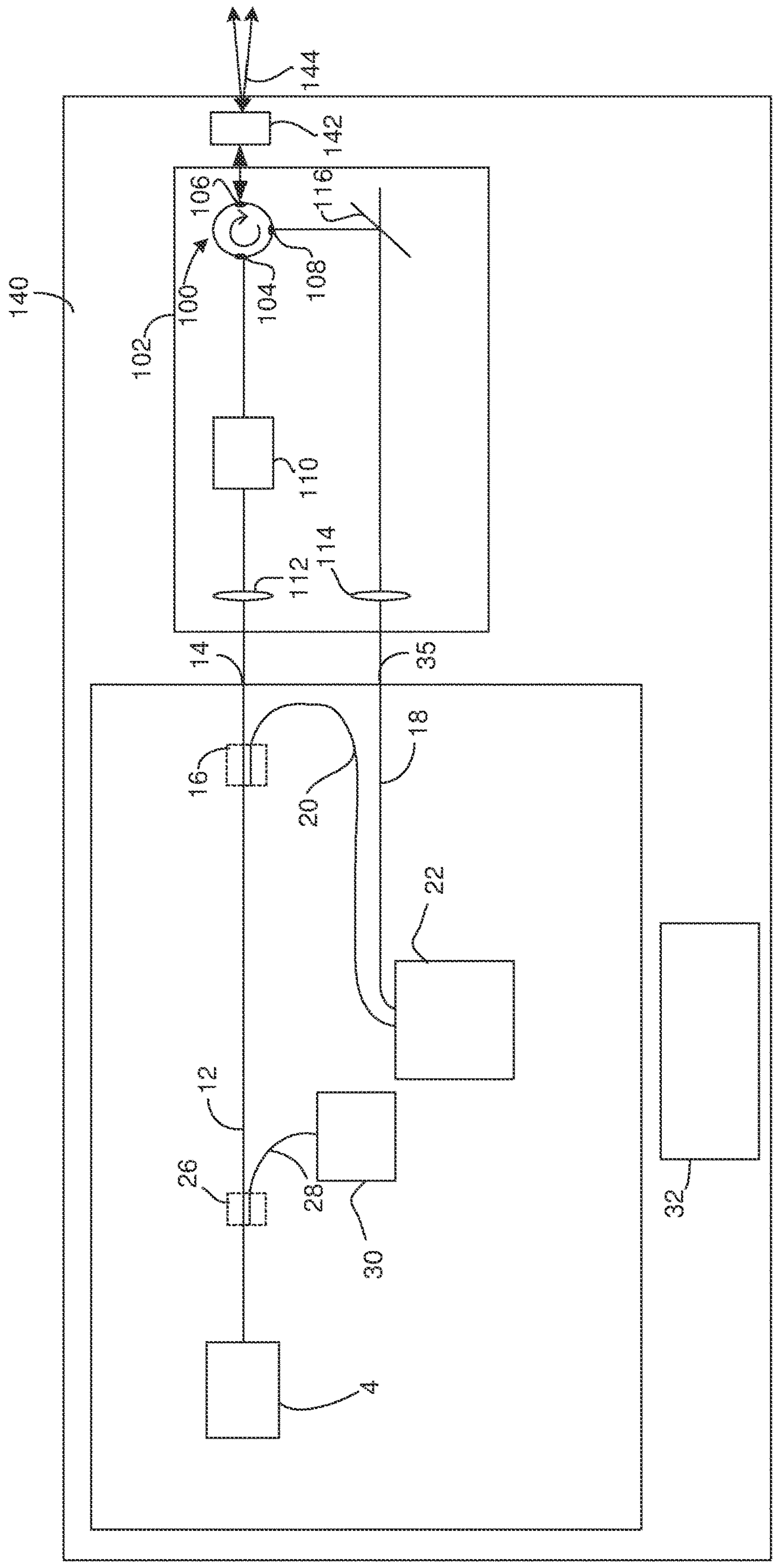
FIG. 4 is a topview of an example of a LIDAR system that includes the LIDAR chip of FIG. 1A and the LIDAR adapter of FIG. 2 on a common support.

When the LIDAR system includes a LIDAR chip and a LIDAR adapter, the LIDAR chip, electronics, and the LIDAR adapter can be positioned on a common mount. Suitable common mounts include, but are not limited to, glass plates, metal plates, silicon plates and ceramic plates. As an example, FIG. 4 is a topview of a LIDAR system that includes the LIDAR chip and electronics 32 of FIG. 1A and the LIDAR adapter of FIG. 2 on a common support 140. Although the electronics 32 are illustrated as being located on the common support, all or a portion of the electronics can be located off the common support. When the light source 4 is located off the LIDAR chip, the light source can be located on the common support 140 or off of the common support 140. Suitable approaches for mounting the LIDAR chip, electronics, and/or the LIDAR adapter on the common support include, but are not limited to, epoxy, solder, and mechanical clamping.

The LIDAR systems can include components including additional passive and/or active optical components. For instance, the LIDAR system can include one or more components that receive the LIDAR output signal from the LIDAR chip or from the LIDAR adapter. The portion of the LIDAR output signal that exits from the one or more components can serve as the system output signal. As an example, the LIDAR system can include one or more beam steering components that receive the LIDAR output signal from the LIDAR chip or from the LIDAR adapter and that output all or a fraction of the LIDAR output signal that serves as the system output signal. For instance, FIG. 4 illustrates a beam steering component 142 that receive a LIDAR output signal from the LIDAR adapter. Although FIG. 4 shows the beam steering component positioned on the common support 140, the beam steering component can be positioned on the LIDAR chip, on the LIDAR adapter, off the LIDAR chip, or off the common support 140. Suitable beam steering components include, but are not limited to, movable mirrors, MEMS mirrors, optical phased arrays (OPAs), and actuators that move the LIDAR chip, LIDAR adapter, and/or common support.

The electronics can operate the one or more beam steering component 142 so as to steer the system output signal to different sample regions 144. The sample regions can extend away from the LIDAR system to a maximum distance for which the LIDAR system is configured to provide reliable LIDAR data. The sample regions can be stitched together to define the field of view. For instance, the field of view of for the LIDAR system includes or consists of the space occupied by the combination of the sample regions.

Figure 5A:
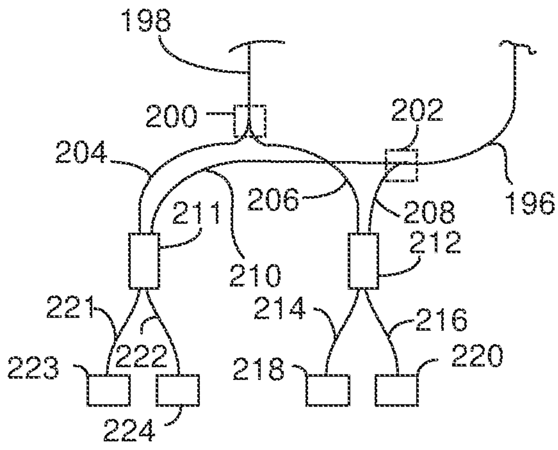
FIG. 5A illustrates an example of a processing component suitable for use with the LIDAR systems.
Figure 5B:
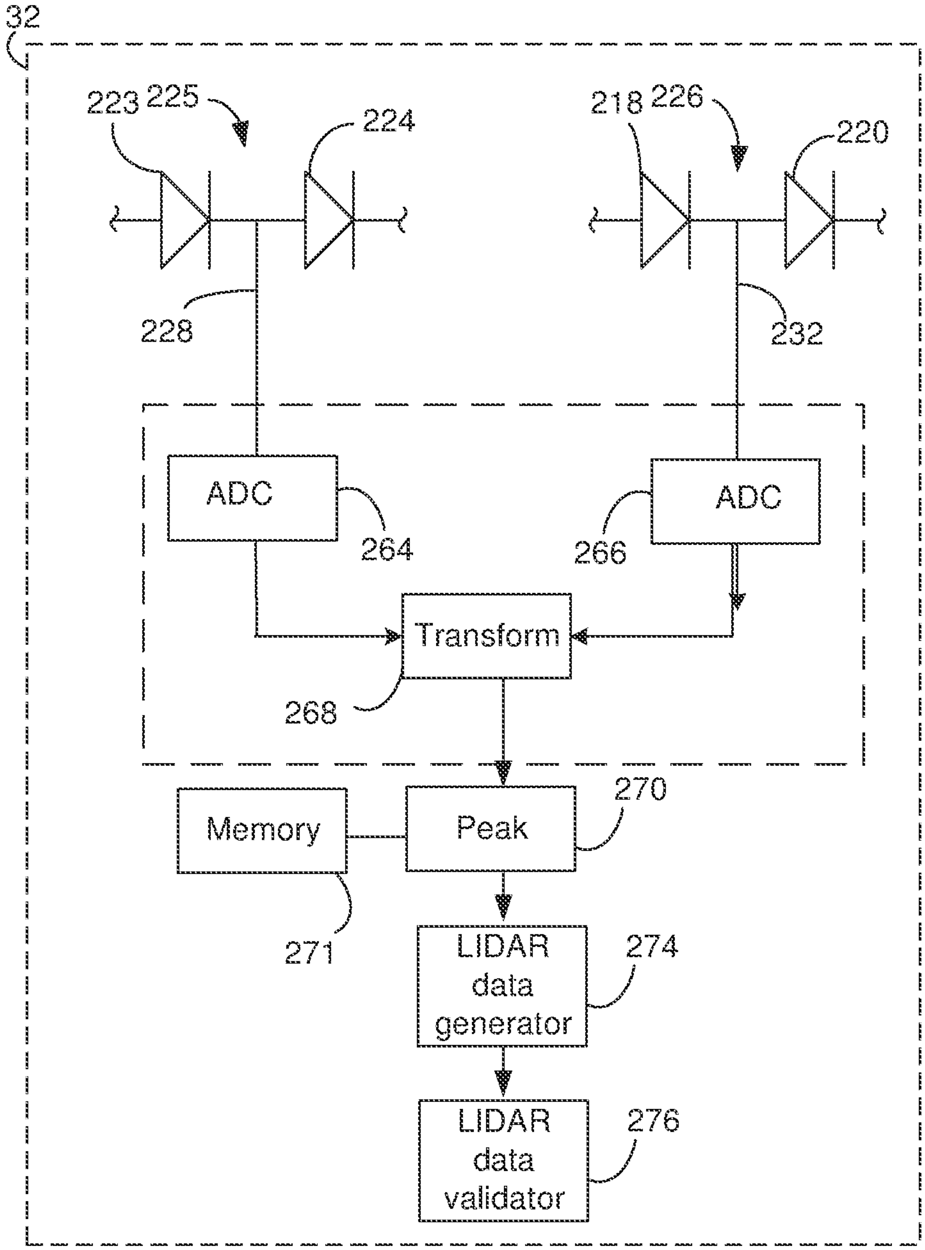
FIG. 5B provides a schematic of electronics that are suitable for use with a processing component constructed according to FIG. 5A.
Figure 5C:
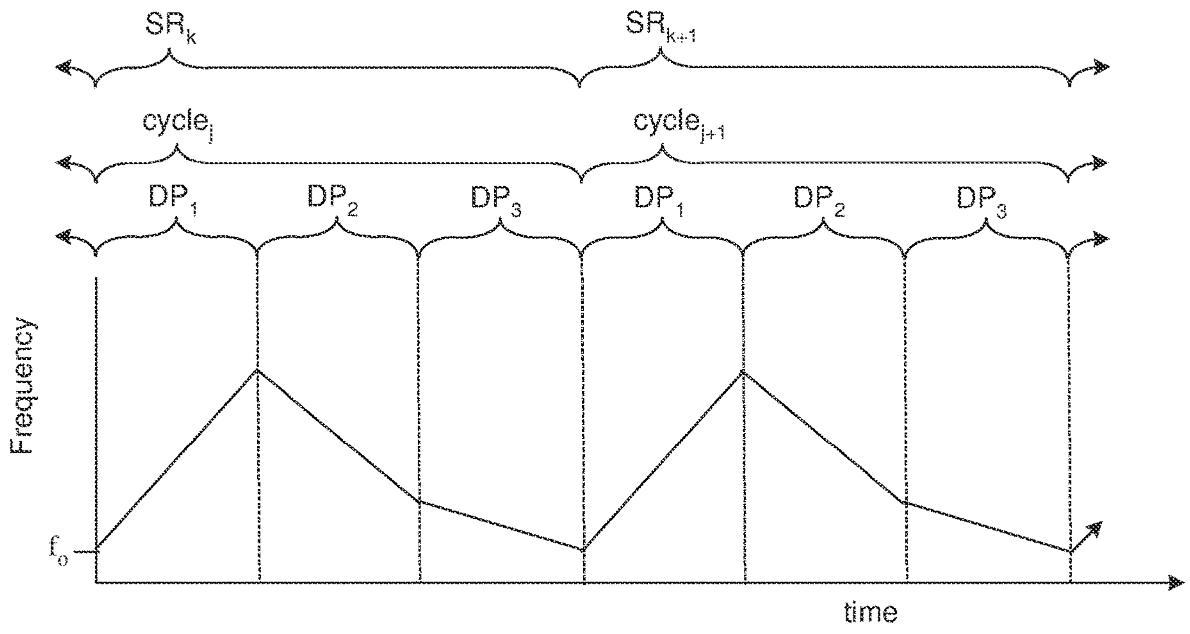
FIG. 5C is a graph of frequency versus time for a system output signal.

FIG. 5A through FIG. 5C illustrate an example of a suitable processing component for use as all or a fraction of the processing components selected from the group consisting of the processing component 22, the first processing component 46 and the second processing component 48. The processing component receives a comparative signal from a comparative waveguide 196 and a reference signal from a reference waveguide 198. The comparative waveguide 18 and the reference waveguide 20 shown in FIG. 1A and FIG. 1B can serve as the comparative waveguide 196 and the reference waveguide 198, the comparative waveguide 18 and the first reference waveguide 42 shown in FIG. 1C can serve as the comparative waveguide 196 and the reference waveguide 198, or the second comparative waveguide 50 and the second reference waveguide 44 shown in FIG. 1C can serve as the comparative waveguide 196 and the reference waveguide 198.

The processing component includes a second splitter 200 that divides the comparative signal carried on the comparative waveguide 196 onto a first comparative waveguide 204 and a second comparative waveguide 206. The first comparative waveguide 204 carries a first portion of the comparative signal to the light-combining component 211. The second comparative waveguide 208 carries a second portion of the comparative signal to the second light-combining component 212.

The processing component includes a first splitter 202 that divides the reference signal carried on the reference waveguide 198 onto a first reference waveguide 204 and a second reference waveguide 206. The first reference waveguide 204 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The first light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 5B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 5B are included on the LIDAR chip. In some instances, the components illustrated in the schematic of FIG. 5B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 32 includes a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes a transform component 268 that receives the complex data signal. For instance, the transform component 268 receives the first digital data signal from the first Analog-to-Digital Converter (ADC) 264 as an input and also receives the second digital data signal from the second Analog-to-Digital Converter (ADC) 266 as an input. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. The electronics use the one or more frequency peaks output from the transform component 268 for further processing to generate the LIDAR data (distance and/or radial velocity between the reflecting object and the LIDAR chip or LIDAR system). The transform component 268 can execute the attributed functions using firmware, hardware or software or a combination thereof.

The electronics 32 includes a peak finder 270 that receives output from the transform component 268. The peak finder 270 is configured to find a peak in output of the transform component 268 in order to identify the beat frequency of the composite optical signal. The mathematical transform can be a complex transform such as a complex Fast Fourier Transform (FFT). A complex transform such as a complex Fast Fourier Transform (FFT) provides an unambiguous solution for the beat frequency of the composite optical signal. In some instances, the peak finder 270 can store the beat frequencies in a memory 271 for later use by a LIDAR data generator 274. As will be described in more detail below, the beat frequencies can each be stored as $f_m$ where m represents a period index. The LIDAR data generator 274 uses the beat frequencies to generate the LIDAR data (distance and/or radial velocity between the reflecting object and the LIDAR chip or LIDAR system). Suitable memories 271 include, but are not limited to, buffers. The peak finder 270 can execute the attributed functions using firmware, hardware or software or a combination thereof.

Although FIG. 5A illustrates light-combining components that combine a portion of the reference signal with a portion of the comparative signal, the processing component can include a single light-combining component that combines the reference signal with the comparative signal so as to form a composite signal. As a result, at least a portion of the reference signal and at least a portion of the comparative signal can be combined to form a composite signal. The combined portion of the reference signal can be the entire reference signal or a fraction of the reference signal and the combined portion of the comparative signal can be the entire comparative signal or a fraction of the comparative signal.

The electronics tune the frequency of the system output signal over time. The system output signal has a frequency versus time pattern with a repeated cycle. FIG. 5C shows an example of a suitable frequency versus time pattern for the system output signal. The base frequency of the system output signal ($f_o$) can be the frequency of the system output signal at the start of a cycle.

FIG. 5C shows frequency versus time for a sequence of two cycles labeled $cycle_j$ and $cycle_{j+1}$ where j represents a cycle index. In some instances, the frequency versus time pattern is repeated in each cycle as shown in FIG. 5C. The illustrated cycles do not include re-location periods and/or re-location periods are not located between cycles. As a result, FIG. 5C illustrates the results for a continuous scan.

Each cycle includes M data periods that are each associated with a period index m and are labeled $DP_m$. Suitable values for M include M≥3. In the example of FIG. 5C, M=3. As a result, each cycle includes three data periods labeled $DP_m$ with m=1, 2, and 3. In some instances, the frequency versus time pattern is the same for the data periods that correspond to each other in different cycles as is shown in FIG. 5C. Corresponding data periods are data periods with the same period index. As a result, each data period $DP_1$ can be considered corresponding data periods and the associated frequency versus time patterns are the same in FIG. 5C. At the end of a cycle, the electronics return the frequency to the same frequency level at which it started the previous cycle.

During the data period $DP_m$, the electronics operate the light source such that the frequency of the system output signal changes linearly as a function of time. For instance, during data period $DP_m$, the frequency of the system output signal can change at a constant or substantially constant rate $\alpha_m$ (the chirp rate). The chirp rate can continue for all or a portion of the duration of the data period. For instance, during the data periods labeled $DP_1$ the electronics operate the light source such that the frequency of the system output signal changes at a linear rate $\alpha_1$, during the data periods labeled $DP_2$ the electronics operate the light source such that the frequency of the system output signal changes at a linear rate $\alpha_2$ and during the data periods labeled $DP_3$ the electronics operate the light source such that the frequency of the system output signal changes at a linear rate $\alpha_3$. In some instances, $\alpha_1$ through $\alpha_M$ are selected such that the sum of $\alpha_1$ through $\alpha_M$ is zero. For instance, when M is equal to three, $\alpha_1$, $\alpha_2$, and $\alpha_3$ can be selected such that $\alpha_1+\alpha_2+\alpha_3=0$ as shown in FIG. 5C. When $\alpha_1+\alpha_2+\alpha_3=0$, the frequency returns to the same frequency level at which it started the previous cycle. In some instances $\alpha_1>0$, $\alpha_2<0$, and $\alpha_3\neq0$ or $\alpha_1<0$, $\alpha_2>0$, and $\alpha_3\neq0$.

FIG. 5C labels sample regions that are each associated with a sample region index k and are labeled $SR_k$. FIG. 5C labels sample regions $SR_k$ through $SR_{k+1}$. Each sample region is illuminated with the system output signal during the data periods that FIG. 5C shows as associated with the sample region. For instance, sample region $SR_{k+1}$ is illuminated with the system output signal during the data periods labeled $DP_1$, $DP_2$, and $DP_3$ within cycle j+1. Accordingly, the sample region labeled $SR_{k+1}$ is associated with the data periods labeled $DP_1$ through $DP_3$ within cycle j+1. The sample region indices k can be assigned relative to time. For instance, the samples regions can be illuminated by the system output signal in the sequence indicated by the index k. As a result, the sample region $SR_{10}$ can be illuminated after sample region $SR_9$ and before $SR_{11}$. Although FIG. 5C illustrates a single sample region illuminated during a cycle, multiple different sample regions can be illuminated during a cycle.

The frequency output from the Complex Fourier transform represents the beat frequency of the composite signals that each includes a comparative signal beating against a reference signal. The beat frequencies from two or more different data periods that are associated with the same sample region can be combined to generate the LIDAR data. For instance, the beat frequency determined from $DP_1$ during the illumination of sample region $SR_k$ can be combined with the beat frequency determined from $DP_2$ during the illumination of sample region $SR_k$ to determine the LIDAR data for sample region $SR_k$. As an example, the beat frequency during data period $DP_m$ can be written as the following Equation 1: $f_m=2\alpha_m R/c-2v/\lambda$ where m is period index, R represents the distance between the LIDAR system and the object, c represents the speed of light, v represents the radial velocity between the reflecting object and the LIDAR system, λ represents the wavelength of the system output signal, and the direction from the reflecting object toward the LIDAR system is assumed to be the positive direction.

The data periods associated with a sample region include multiple subject data periods and at least one check data period. In FIG. 5C, the $DP_1$ and $DP_2$ associated with each sample region can serve as subject sample regions and the $DP_3$ associated with the sample region can serve as a check data period. The rate of change in the frequency of the system output signal during data period m ($\alpha_m$) can be different for each of the subject data periods. Although FIG. 5C illustrates two subject data periods, a sample region can be illuminated by a system output signal for more than two subject data periods. Accordingly, in some instances, a cycle includes more than two subject data periods. The rate of change in the frequency of the system output signal during a check data period can be different from the rate of change in the frequency of the system output signal for all or a portion of the subject data periods. Accordingly, the rate of change in the frequency of the system output signal during each of the data periods associated with the same sample region can be different. In some instances, the rate of change in the frequency of the system output signal during a check data period is non-zero.

The frequency of the system output signal can increase during one of the subject data periods associated with a sample region as is evident from the data period $DP_1$ of FIG. 5C. The beat frequency of the composite signal in a subject data period where the frequency of the system output signal increases (increasing data period) can be represented by $f_{ub}$ and the rate of increase can be written as $\alpha_{ub}$. As a result, in the example of FIG. 5C, $f_1=f_{ub}$ and $\alpha_1=\alpha_{ub}$. The frequency of the system output signal can decrease during one of the subject data periods associated with the same sample region as is evident from the data period $DP_2$ of FIG. 5C. The beat frequency of the composite signal in a data period where the frequency of the system output signal decreases can be represented by $f_{db}$ and the rate of decrease can be written as $\alpha_{db}$. As a result, in the example of FIG. 5C, $f_2=f_{db}$ and $\alpha_2=\alpha_{db}$.

The beat frequency of the composite signal in a check data period can be represented by $f_{chk}$ and the rate of frequency change can be written as $\alpha_{chk}$. As noted above, the data periods labeled $DP_3$ in FIG. 5C can each serve as a check data period for one of the sample regions. As a result, in the example of FIG. 5C, $f_3=f_{chk}$ and $\alpha_3=\alpha_{chk}$. The beat frequency of the composite signal for a check data period ($f_{chk}$) and the rate of frequency change for the check data period ($\alpha_{chk}$) are associated with the beat frequencies $f_{ub}$ and $f_{db}$ from the same data period. For instance, the same sample region that is illuminated during a check data period is also illuminated during the associated subject data periods. As an example, in FIG. 5C, the beat frequencies that result from data periods labeled $DP_1$, $DP_2$, and $DP_3$ ($f_1$, $f_2$, and $f_3$) in the sample region labeled $SR_k$ are associated.

In the above Equation 1 ($f_m=2\alpha_m R/c-2v/\lambda$), the values of v and R are unknown. As a result, the results of Equation 1 from two different data periods associated with the sample region can be used to calculate the values of v and R for the data period. Solving these equations for the distance between the LIDAR system and the object (R) provides Equation 2: $R=c(f_{ub}-f_{db})/(2(\alpha_{ub}-\alpha_{db}))$. Additionally, solving these equations for the radial velocity between the reflecting object and the LIDAR system (v) provides Equation 3: $v=\lambda(\alpha_{db}f_{ub}-\alpha_{ub}f_{db})/(2(\alpha_{ub}-\alpha_{db}))$. As shown in FIG. 5B, the electronics include a LIDAR data generator 274 that receives the beat frequencies from the memory 271 and/or peak finder 270. The LIDAR data generator 274 can use the beat frequencies in the above equations to calculate the distance and/or radial velocity (R and/or v) for the sample region that is illuminated so as to provide the beat frequencies. The resulting distance and/or radial velocity (R and/or v) values can represent candidate LIDAR data for the sample region. For instance, the resulting distance (R) can serve as a candidate distance and/or the resulting radial velocity (v) can serve as a candidate radial velocity. The candidate LIDAR data is potentially the LIDAR data for the sample region that is illuminated during the data periods that are the source of $f_{ub}$, $f_{db}$, and $f_{chk}$. The LIDAR data generator 274 can execute the attributed functions using firmware, hardware or software or a combination thereof.

The electronics can include a LIDAR data validator 276 that receives the candidate LIDAR data from the LIDAR data generator 274. The LIDAR data validator 276 can also receive beat frequencies such as the check period beat frequency ($cf_{chk}$) from the memory 271 and/or peak finder 270.

The LIDAR data validator 276 can use the check data period associated with a sample region to determine whether the associated candidate LIDAR data is valid for that sample region. For instance, the LIDAR data validator 276 can calculate a comparative check period beat frequency ($cf_{chk}$) for a sample region from the candidate LIDAR data associated with the sample region. The comparative check period beat frequency ($cf_{chk}$) can be determined by substituting the rate of frequency change during the check data period $\alpha_{chk}$ into Equation 1 to provide Equation 4: $cf_{chk}=2\alpha_{chk}R/c-2v/\lambda$. As a result, the LIDAR data validator 276 can calculate the comparative check period beat frequency ($cf_{chk}$) for a sample region from $cf_{chk}=2\alpha_{chk}R/c-2v/\lambda$ where R represents the candidate distance and v represents the candidate radial velocity for the sample region.

The LIDAR data validator 276 can use the comparative check period beat frequency ($cf_{chk}$) for a sample region to determine whether the candidate LIDAR data for the sample region is valid. For instance, the LIDAR data validator 276 can apply one or more check criteria to the comparative check period beat frequency ($cf_{chk}$). As an example, the LIDAR data validator 276 can compare the values of the check data period ($f_{chk}$) and the comparative check period beat frequency ($cf_{chk}$) from the same data period. For instance, when the LIDAR data validator 276 determines that comparative check period beat frequency ($cf_{chk}$) is within a window of values that include the check period beat frequency ($f_{chk}$), the LIDAR data validator 276 determines that the candidate LIDAR data for the sample region is valid. Accordingly, the LIDAR data validator can classify the candidate LIDAR data for the sample region as the LIDAR data for the sample region. When the LIDAR data validator 276 determines that comparative check period beat frequency ($cf_{chk}$) is outside the window, the candidate LIDAR data can be found to be invalid for the sample region. As a result, the LIDAR data validator 276 can classify the candidate LIDAR data for the sample region as unavailable. The candidate LIDAR data classified as unavailable is essentially removed from the final LIDAR data for the sample regions in the field of view for the LIDAR system. The LIDAR data validator 276 can execute the attributed functions using firmware, hardware or software or a combination thereof.

An example of the window of values that include the check period beat frequency ($f_{chk}$) is values in a range of $f_{chk}-C_1$ to $f_{chk}+C_2$ where $C_1$ and $C_2$ are positive constants and none, one, or both of $C_1$ and $C_2$ can be zero. Accordingly, an example of comparing the values of the check period beat frequency ($f_{chk}$) and the comparative check period beat frequency ($cf_{chk}$) includes making a determine whether the comparative check period beat frequency ($cf_{chk}$) is within a range of $f_{chk}-C_1$ to $f_{chk}+C_2$. For instance, is $f_{chk}-C_1\leq cf_{chk}\leq f_{chk}+C_2$ true? When $f_{chk}-C_1\leq cf_{chk}\leq f_{chk}+C_2$ is true the LIDAR data validator can classify the candidate LIDAR data for the sample region as the LIDAR data for the sample region and when $f_{chk}-C_1\leq cf_{chk}\leq f_{chk}+C_2$ is false, the candidate LIDAR data can be found to be invalid for the sample region. The values of $C_1$ and $C_2$ can be the same or different. Suitable values for $C_1$ and/or $C_2$, include, but are not limited to, values greater than or equal to 0.01 MHz, or 0.5 MHz, and less than or equal to 2 MHz, or 100 MHz. The selected values of $C_1$ and $C_2$ can be a function of the LIDAR system.

Figure 5D:
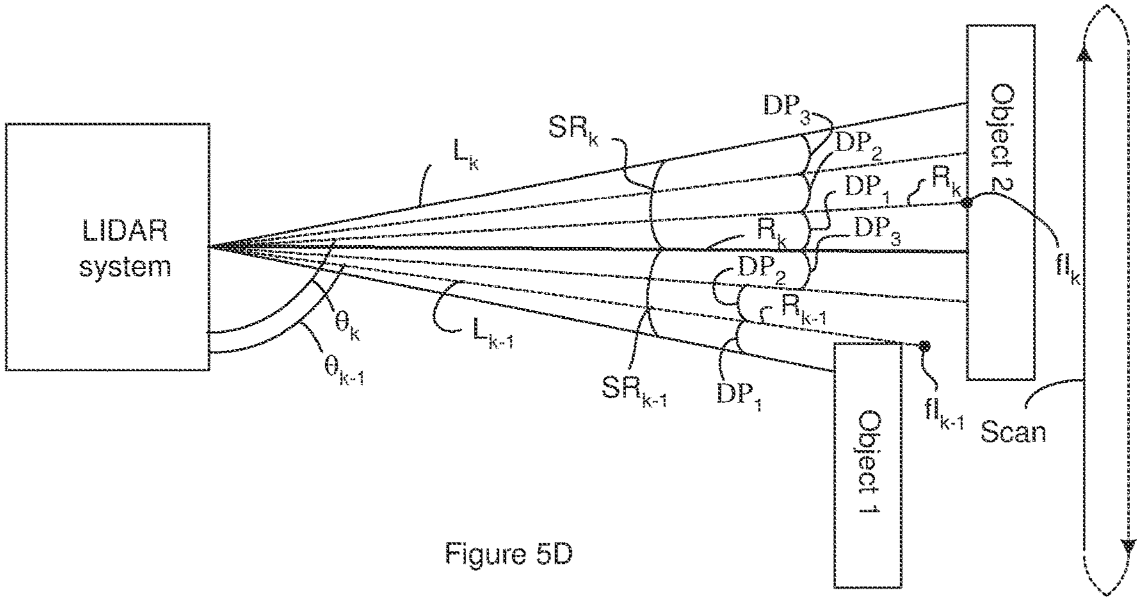
FIG. 5D is a diagram illustrating the edge effect as a source of errors in LIDAR data.

The validation performed by the LIDAR data validator 276 can reduce the presence of edge errors in the LIDAR data for a field of view. FIG. 5D illustrates edge errors that can occur in the calculation of LIDAR data. FIG. 5D illustrates two different objects located in the field of view of a LIDAR system. The LIDAR system outputs a system output signal that is scanned in the direction of the solid line labeled "scan." The system output signal is scanned through a series of sample regions labeled $SR_{k-1}$ and $SR_k$.

The collection of sample regions that are scanned by the system output signal make up the field of view for the LIDAR system. The object(s) in the field of view can change with time. As a result, the locations of the sample regions are determined relative to the LIDAR system rather than relative to the atmosphere in which the LIDAR system is positioned. For instance, the sample regions can be defined as being located within a range of angles relative to the LIDAR system. The dashed line in FIG. 5D illustrates that the scan of the sample regions in the field of view can be repeated in multiple scan cycles. Accordingly, each scan cycle can scan the system output signal through the same sample regions when the objects in the field of view have moved and/or changed. The sample regions in the field of view can be scanned in the same sequence during different scan cycles or can be scanned in different sequences in in different scan cycles.

The portion of each sample region that corresponds to one of the data periods are each labeled $DP_1$, $DP_2$, or $DP_2$ in FIG. 5D. The chirp rate during data period $DP_1$ is $\alpha_1$, the chirp rate during the data period $DP_2$ is $\alpha_2$, the chirp rate during the data period $DP_3$ is $\alpha_3$. The duration of a data period can be equal to the duration of the chirp during that data period.

The movement of the system output signal causes the system output signal to go from being incident on object 1 during illumination of the sample region labeled $SR_{k-1}$ to being incident on object 2 during illumination of the sample region labeled $SR_k$. During illumination of the sample region labeled $SR_{k-1}$, the system output signal is incident on different objects during a portion of data period $DP_1$ and a portion of data period $DP_2$. The change in the object that receives the system output signal during the illumination of sample region $SR_{k+1}$ can be a source of error in the LIDAR data that is generated for sample region $SR_{k-1}$. For instance, FIG. 5D includes dashed lines labeled $R_{k-1}$ through $R_k$ where $R_k$ represents the value that the electronics determine for the distance between the LIDAR system and an object as a result of the system output signal transmitted during sample region $SR_k$. As is evident from the distance labeled $R_{k-1}$, the change in the object that is illuminated by the system output signal during the illumination of a sample region can produce an error in the distance measured for that sample region. A similar error occurs for the radial velocity calculated for that sample region.

The source of the LIDAR data error illustrated in FIG. 5D results from the system output signal being incident on an edge of an object during the illumination of a sample region. As a result, the error can be considered an edge effect error. While the error is illustrated as occurring due to different objects, it can also occur with a single object. For instance, the error can also occur when scanning a system output signal across an edge of an object during the illumination of a sample region causes the system output signal to be incident on different surfaces of the object.

The application of the one or more check criteria reduces errors from the edge effect. For instance, the comparative check period beat frequency ($cf_{chk}$) is an approximation of the value of the check period beat frequency ($f_{chk}$) but rather than being a function of the value of the beat frequency in the check period, the comparative check period beat frequency ($cf_{chk}$) is a function of the beat frequencies from multiple different subject data periods. As a result, the comparative check period beat frequency ($cf_{chk}$) in the check period is calculated from the beat frequencies in multiple different subject data periods. For instance, in the above examples, the comparative check period beat frequency ($cf_{chk}$) is calculated from the beat frequencies during an increasing data period and a decreasing data period. As a result, the comparative check period beat frequency ($cf_{chk}$) is a function of the distance (R) and radial velocity (v) values during data periods other than a check data period. In contrast, the check period beat frequency ($f_{chk}$) is a function of the distance (R) and radial velocity (v) values during the check data period. Accordingly, the value of the comparative check period beat frequency ($cf_{chk}$) matches the value of the associated check period beat frequency ($f_{chk}$) when the distance (R) and radial velocity (v) values match during both the check data period and during the other associated data periods. For instance, the value of the comparative check period beat frequency ($cf_{chk}$) matches the value of the associated check period beat frequency ($f_{chk}$) when the distance (R) and radial velocity (v) remain constant or substantially constant during the check data period, the associated increasing data period, and the associated decreasing data period. Removing candidate LIDAR data where the distance (R) and radial velocity (v) do not remain constant or substantially constant during illumination of a sample region from the final LIDAR data values in the field of view, removes candidate LIDAR data that may result from the system output signal changing surfaces during the illumination of the sample region and accordingly reduces the presence of the edge error effect.

Filtering out candidate LIDAR data where the distance (R) and radial velocity (v) substantially change during illumination of a sample region has proven to reduce the presence of other errors that occur in the generation of LIDAR data for a field of view. For instance, outliers occur where the LIDAR data for a sample region is not consistent with the LIDAR data for surrounding sample regions. Outliers do not necessarily occur at a transition between surfaces but can occur in the middle of a surface. As a result, an outlier can be LIDAR data for a sample region where the system output signal is incident on a surface, but that LIDAR data is not consistent with LIDAR data from adjacent sample regions where the system output signal is incident on the same surface. Removing candidate LIDAR data where the distance (R) and radial velocity (v) do not remain constant or substantially constant during illumination of a sample region has been shown to reduce the presence of outliers. Aliasing will also be reduced by the extraction of these candidate LIDAR data values from the final LIDAR data values in the field of view.

Figure 6:
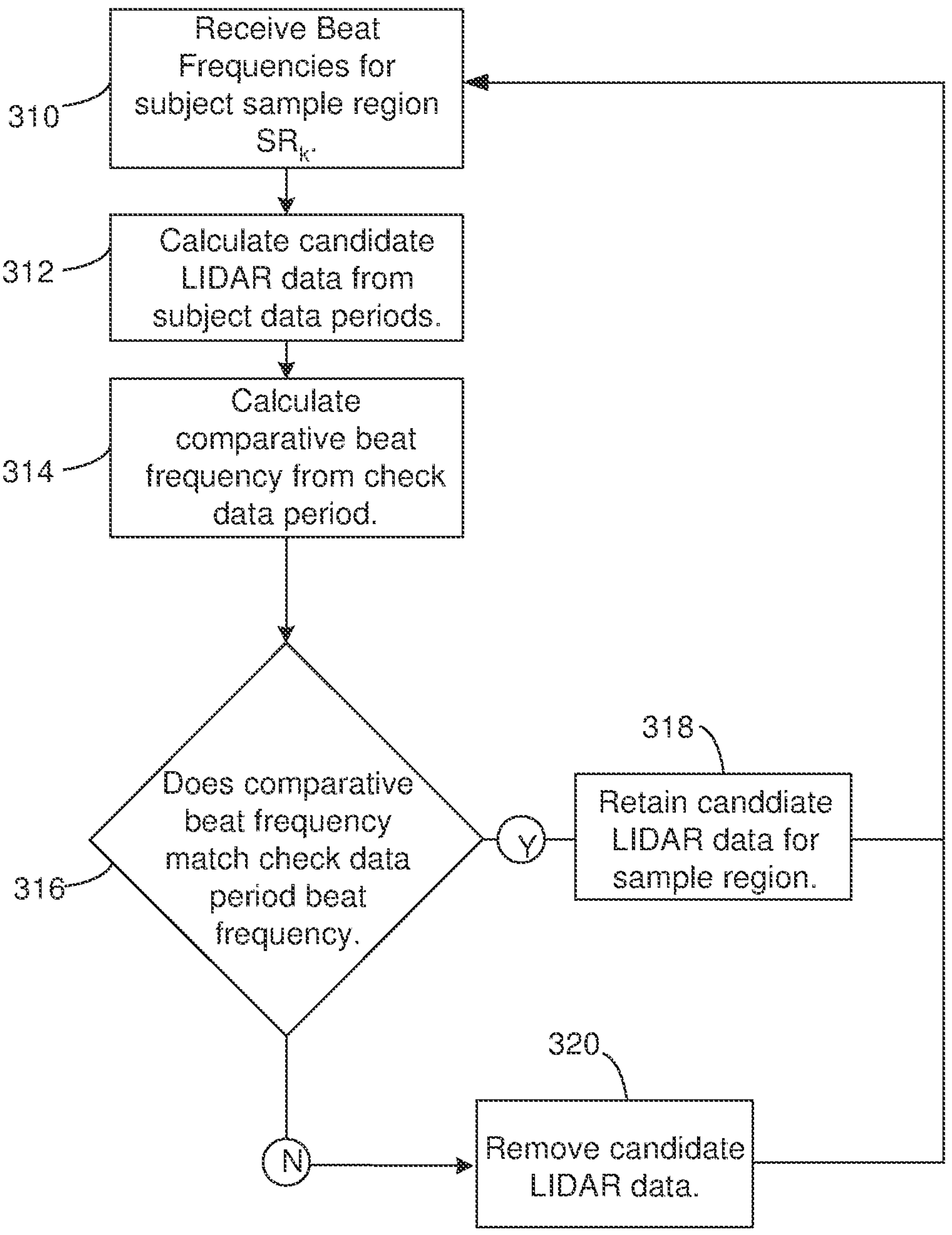
FIG. 6 illustrates a flow diagram for a LIDAR data refinement process.

FIG. 6 is a flow diagram for a LIDAR data refinement process that can be used to filter candidate LIDAR data. At process block 310, the beat frequencies are received for a subject one of the sample regions ($SR_k$). For instance, the LIDAR data generator 274 can receive the beat frequencies from the memory 271 and/or peak finder 270. As noted above, the received beat frequencies include two or more subject data periods and at least one check data period. For instance, when the system output signal has a frequency versus time pattern according to FIG. 5C, the received beat frequencies can include the beat frequencies that result from the system output signal during data periods $DP_1$, $DP_2$, and $DP_3$ ($f_1$, $f_2$, and $f_3$) of the subject sample region $SR_k$. In some instance, $DP_1$ and $DP_2$ can serve as subject data periods and $DP_3$ can serve as a check data period. As another example, $DP_1$ and $DP_3$ can serve as subject data periods and $DP_2$ can serve as a check data period.

At process block 312, the candidate LIDAR data is calculated from the beat frequency that result from the output of the system output signal during each one of multiple different subject data periods. The candidate LIDAR data need not be a function of the beat frequency that result from the output of the system output signal during the check data period. As a result, the calculation of the candidate LIDAR data can exclude the use of the beat frequency that result from the output of the system output signal during the check data period as a variable. For instance, the LIDAR data generator 274 can use the received beat frequencies in combination with the above Equation 1 and/or Equation 2 to calculate a potential value for the distance between the LIDAR system and an object in the sample region (R) and/or a potential value for the radial velocity between the LIDAR system and an object in the sample region. In an example where the system output signal has a frequency versus time pattern according to FIG. 5C and $DP_1$ and $DP_2$ serve as subject data periods, $f_1$ of the subject sample region can serve as $f_{ub}$ and $f_2$ of the subject sample region can serve as fab in Equation 2 and/or Equation 3.

At process block 314, the beat frequency of the composite signal in the check data period (comparative check period beat frequency, $cf_{chk}$) is calculated. The comparative check period beat frequency ($cf_{chk}$) can be calculated from the beat frequency that result from the output of the system output signal during each one of multiple different subject data periods. The comparative check period beat frequency ($cf_{chk}$) need not be a function of the beat frequency that result from the output of the system output signal during the check data period. As a result, the calculation of the comparative check period beat frequency ($cf_{chk}$) can exclude the use of the beat frequency that result from the output of the system output signal during the check data period as a variable. For instance, the LIDAR data validator 276 can receive the candidate LIDAR data from the LIDAR data generator 274 and can use the results in combination with Equation 4 to calculate the comparative check period beat frequency ($cf_{chk}$). Alternately, the LIDAR data validator 276 can receive the beat frequencies from the memory 271 and/or peak finder 270 and can use the received beat frequencies in combination with Equation 2, Equation 3, and Equation 4 to calculate the comparative check period beat frequency ($cf_{chk}$).

At determination block 316, a determination is made whether the comparative check period beat frequency ($cf_{chk}$) matches the beat frequency during the check period (the check period beat frequency, $f_{chk}$). In an example where the system output signal has a frequency versus time pattern according to FIG. 5C and $DP_3$ serve as a check data period, a determination is made whether the comparative check period beat frequency ($cf_{chk}$) matches $f_{chk}$ where $f_3$ serves as $f_{chk}$. For instance, the one or more check criteria can be applied to the comparative check period beat frequency ($cf_{chk}$) to determine whether the comparative check period beat frequency ($cf_{chk}$) matches the beat frequency during the check period ($f_{chk}$). For instance, as noted above, the LIDAR data validator 276 can determine whether the comparative check period beat frequency ($cf_{chk}$) is within the window of values that include the check period beat frequency ($f_{chk}$). As discussed above, an example of the window of values that include the check period beat frequency ($f_{chk}$) is values in a range of $f_{chk}-C_1$ to $f_{chk}+C_2$ where $C_1$ and $C_2$ are positive constants and none, one, or both of $C_1$ and $C_2$ can be zero. When the LIDAR data validator 276 determines that comparative check period beat frequency ($cf_{chk}$) is within the window of values, the LIDAR data validator 276 determine that the comparative check period beat frequency ($cf_{chk}$) matches the beat frequency during the check period. When the LIDAR data validator 276 determines that comparative check period beat frequency ($cf_{chk}$) is outside the window of values, the LIDAR data validator 276 determine that the comparative check period beat frequency ($cf_{chk}$) does not match the beat frequency during the check period.

When the LIDAR data validator 276 determines that comparative check period beat frequency ($cf_{chk}$) matches the beat frequency during the check period, the LIDAR data validator 276 proceeds to process block 318 where the candidate LIDAR data for the subject sample region is classified as valid. As a result, the candidate LIDAR data for the subject sample region serves as the actual LIDAR data for the subject sample region. The actual LIDAR data for the subject sample region is the value of the distance between the LIDAR system and an object in the sample region (R) and/or a value for the radial velocity between the LIDAR system and an object in the sample region. As a result, when the LIDAR data for the sample regions in the field of view for the LIDAR system is made available to an application for further processing, the candidate LIDAR data for the subject sample region is included as the actual LIDAR data for the sample region.

When the LIDAR data validator 276 determines that comparative check period beat frequency ($cf_{chk}$) does not match the beat frequency during the check period, the LIDAR data validator 276 proceeds to process block 320 where the candidate LIDAR data for the subject sample region is classified as unavailable. As a result, the candidate LIDAR data for the subject sample region does not serve as the actual LIDAR data for the subject sample region. The classification effectively removes the candidate LIDAR data for the subject sample region from the collection of LIDAR data results for the sample regions in the field of view of the LIDAR system. As a result, when the LIDAR data results for the sample regions in the field of view of the LIDAR system are made available to a LIDAR application for further processing, the candidate LIDAR data for the subject sample region is excluded from the LIDAR data results for the field of view.

The electronics can return to process block 310 from process block 318 or process block 320. At process block 310, the beat frequencies are received for the next subject sample region. For instance, the LIDAR data generator 274 can receive the beat frequencies for sample region $SR_{k+1}$. When each of the sample regions in the field of view that is to serve as one of the subject sample regions has served as the subject sample region, the collection of LIDAR data results for the sample regions in the field of view can be made available to a LIDAR application for further processing. A first portion of the sample regions in the field of view will not have LIDAR data results due to the application of the one or more check criteria to the comparative beat frequencies for these sample regions providing a first result indicating a mismatch between the comparative check period beat frequency ($cf_{chk}$) and the measured beat associated with the sample region. In contrast, a second portion of the sample regions in the field of view will each have LIDAR data results due to the application of the one or more check criteria to the comparative beat frequencies for these sample regions providing a second result indicating a match between the comparative check period beat frequency ($cf_{chk}$) and the measured beat associated with the sample region. Examples of LIDAR applications include, but are not limited to, self-driving cars, robotics, and industrial applications.

Although the mathematical transformer 268 is disclosed as performing complex transforms on a complex signal, the complex transforms can be replaced with real transforms performed on real signals. As a result, the optical-to-electrical assembly of FIG. 5A can be simplified so as to exclude the second light-combining component 212, the comparative waveguide 206, the second splitter 202, the second reference waveguide 208, first auxiliary light sensor 218, the second auxiliary light sensor 220, and the associated components shown in FIG. 5A and FIG. 5B.

Suitable electronics 32 can include, but are not limited to, a controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. In some instances, the functions of the LIDAR data generator, the data correction component 272, peak finder can be executed by Field Programmable Gate Arrays (FPGAs), digital signal processors (DSPs), Application Specific Integrated Circuits, firmware, software, hardware, and combinations thereof. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Figure 7:
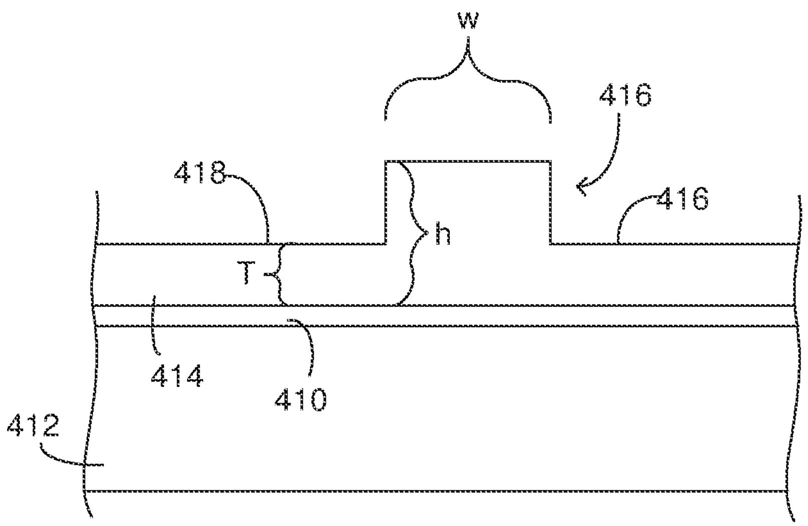
FIG. 7 is a cross-section of portion of a LIDAR chip that includes a waveguide on a silicon-on-insulator platform.

Suitable platforms for the LIDAR chips include, but are not limited to, silica, indium phosphide, and silicon-on-insulator wafers. FIG. 7 is a cross-section of portion of a chip constructed from a silicon-on-insulator wafer. A silicon-on-insulator (SOI) wafer includes a buried layer 410 between a substrate 412 and a light-transmitting medium 414. In a silicon-on-insulator wafer, the buried layer 410 is silica while the substrate 412 and the light-transmitting medium 414 are silicon. The substrate 412 of an optical platform such as an SOI wafer can serve as the base for the entire LIDAR chip. For instance, the optical components shown on the LIDAR chips of FIG. 1A through FIG. 1C can be positioned on or over the top and/or lateral sides of the substrate 412.

The portion of the chip illustrated in FIG. 7 includes a waveguide construction that is suitable for use in LIDAR chips constructed from silicon-on-insulator wafers. A ridge 416 of the light-transmitting medium 414 extends away from slab regions 418 of the light-transmitting medium. The light signals are constrained between the top of the ridge 416 and the buried oxide layer 410.

The dimensions of the ridge waveguide are labeled in FIG. 7. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multimode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 7 is suitable for all or a portion of the waveguides on LIDAR chips constructed according to FIG. 1A through FIG. 1C.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first auxiliary light sensor 218, the second auxiliary light sensor 220, the first light sensor 223, and the second light sensor 224.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,472, issued on Aug. 22, 2000 each of which is incorporated herein in its entirety. The use of light sensors that are integrated with the chip are suitable for all or a portion of the light sensors selected from the group consisting of the auxiliary light sensor 218, the second auxiliary light sensor 220, the first light sensor 223, and the second light sensor 224.

The light source 4 that is interfaced with the utility waveguide 12 can be a laser chip that is separate from the LIDAR chip and then attached to the LIDAR chip. For instance, the light source 4 can be a laser chip that is attached to the chip using a flip-chip arrangement. Use of flip-chip arrangements is suitable when the light source 4 is to be interfaced with a ridge waveguide on a chip constructed from silicon-on-insulator wafer. Alternately, the utility waveguide 12 can include an optical grating (not shown) such as Bragg grating that acts as a reflector for an external cavity laser. In these instances, the light source 4 can include a gain element that is separate from the LIDAR chip and then attached to the LIDAR chip in a flip-chip arrangement. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. When the light source 4 is a gain element or laser chip, the electronics 32 can change the frequency of the outgoing LIDAR signal by changing the level of electrical current applied to through the gain element or laser cavity.

The above LIDAR systems include multiple optical components such as a LIDAR chip, LIDAR adapters, light source, light sensors, waveguides, and amplifiers. In some instances, the LIDAR systems include one or more passive optical components in addition to the illustrated optical components or as an alternative to the illustrated optical components. The passive optical components can be solid-state components that exclude moving parts. Suitable passive optical components include, but are not limited to, lenses, mirrors, optical gratings, reflecting surfaces, splitters, demulitplexers, multiplexers, polarizers, polarization splitters, and polarization rotators. In some instances, the LIDAR systems include one or more active optical components in addition to the illustrated optical components or as an alternative to the illustrated optical components. Suitable active optical components include, but are not limited to, optical switches, phase tuners, attenuators, steerable mirrors, steerable lenses, tunable demulitplexers, tunable multiplexers.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of operating a LIDAR system, comprising:

transmitting a system output signal from the LIDAR system such that a sample region is illuminated by the system output signal, during illumination of the sample region, the system output signal includes a check data period and multiple subject data periods, the check data period and each one of the multiple subject data periods being a different portion of the system output signal, a frequency of the system output signal changing at different rates during the subject data periods;

combining light that returns to the LIDAR system from the system output signal with light from a reference signal so as to generate a beating signal beating at a beat frequency, the reference signal including light that has not exited from the LIDAR system;

calculating a comparative beat frequency, calculating multiple beat frequencies that each represents the beat frequency that results from a different one of the multiple subject data periods, the comparative beat frequency approximating a value of the beat frequency of the beating signal during the check data period, the comparative beat frequency being calculated using each one of the multiple beat frequencies.

2. The method of claim 1, wherein the comparative beat frequency is calculated such that the comparative beat frequency value matches the beat frequency during the check data period when the distance and/or radial velocity between the LIDAR system and n object located in the sample region during the subject data periods matches the distance and/or radial velocity between the LIDAR system and the object during the check data period.

3. The method of claim 1, further comprising: comparing a value of the comparative beat frequency with the value of the beat frequency of the beating signal during the check data period.

4. The method of claim 3, further comprising: making a determination whether the comparative beat frequency is within a window of values, the window of values includes the value of the beat frequency of the beating signal during the check data period.

5. The method of claim 4, further comprising:

calculating candidate LIDAR data from each one of the multiple beat frequencies the beat frequencies of the beating signal during the subject data periods, the candidate LIDAR data indicating a potential radial velocity and/or a potential distance between the LIDAR system and an object in the sample region; and classifying the candidate LIDAR data such that the candidate LIDAR data does not represent LIDAR data for the sample region in response to the comparative beat frequency being outside the window of values, the LIDAR data indicating a radial velocity and/or a distance between the LIDAR system and the object.

6. The method of claim 4, further comprising:

calculating candidate LIDAR data from the beat frequencies of the beating signal during the subject data periods each one of the multiple beat frequencies, the candidate LIDAR data indicating a potential radial velocity and/or a potential distance between the LIDAR system and an object in the sample region; and classifying the candidate LIDAR data such that the candidate LIDAR data represents LIDAR data for the sample region in response to the comparative beat frequency being within the window of values, the LIDAR data indicating a radial velocity and/or a distance between the LIDAR system and the object.

7. The method of claim 1, further comprising:

calculating LIDAR data from each one of the multiple beat frequencies the beat frequency of the beating signal during multiple different subject data periods, the LIDAR data indicating a radial velocity and/or distance between the LIDAR system and an object in the sample region.

8. The method of claim 7, wherein the calculation of the LIDAR data excludes the beat frequency of the beating signal during the check data period.

9. The method of claim 1, wherein the sample region is one of multiple different sample regions that are sequentially illuminated by the system output signal and further comprising:

calculating the comparative beat frequency for each of the sample regions, calculating the candidate LIDAR data for each of the different sample regions, the candidate LIDAR data for each of the sample regions being calculated from the beat frequency that results from illumination of the sample region during multiple different data periods, the candidate LIDAR data for each of the sample regions indicating a potential radial velocity and/or potential distance between the LIDAR system and an object located in the sample region, and LIDAR data for each of the sample regions indicating a radial velocity and/or a distance between the LIDAR system and an object located in the sample region;

applying one or more check criteria to each of the comparative beat frequencies, in response to the application of the one or more check criteria to the comparative beat frequencies for each of the sample regions in a first portion of the sample regions providing a first result, classifying the candidate LIDAR data for the sample regions in the first portion of the sample regions such that the candidate LIDAR data for each of the sample regions in the first portion of the sample regions represents the LIDAR data for the sample regions in the first portion of the sample regions, and in response to the application of the one or more check criteria to the comparative beat frequencies for each of the sample regions in a second portion of the sample regions providing a second result, classifying the candidate LIDAR data for the sample regions in the second portion of the sample regions such that the candidate LIDAR data for each of the sample regions in the second portion of the sample regions does not represent the LIDAR data for the sample regions in the second portion of the sample regions.

10. The method of claim 1, wherein the rate of change in the frequency of the system output signal during the check data periods is different from the rate of change in the frequency of the system output signal during a portion of the multiple subject data periods.

11. A system, comprising:

a LIDAR system configured to output a system output signal such that a sample region is illuminated by the system output signal, during illumination of the sample region, the system output signal includes a check data period and multiple subject data periods, the check data period and each one of the multiple subject data periods being a different portion of the system output signal;

a frequency of the system output signal changing at different rates during the subject data periods;

the LIDAR system including a light-combining component that combines light that returns to the LIDAR system from the system output signal with light from a reference signal so as to generate a beating signal beating at a beat frequency, the reference signal including light that has not exited from the LIDAR system; and electronics configured to calculate a comparative beat frequency, the comparative beat frequency approximating a value of the beat frequency of the beating signal that results from the check data period, the electronics configured to calculate multiple beat frequencies that each represents the beat frequency that results from a different one of the multiple subject data periods, and the comparative beat frequency being calculated using each one of the multiple beat frequencies the beat frequency of the beating signal from multiple different subject data periods.

12. The system of claim 11, wherein the comparative beat frequency is calculated such that the comparative beat frequency value matches the beat frequency during the check data period when the distance and/or radial velocity between the LIDAR system and an object located in the sample region during the multiple subject data periods matches the distance and/or radial velocity between the LIDAR system and the object during the check data period.

13. The system of claim 11, wherein the electronics are configured to compare a value of the comparative beat frequency with the value of the beat frequency of the beating signal during the check data period.

14. The system of claim 13, wherein the electronics are configured to make a determination whether the comparative beat frequency is within a window of values, the window of values including the value of the beat frequency of the beating signal during the check data period.

15. The system of claim 14, further comprising:

calculating candidate LIDAR data from each one of the multiple beat frequencies the beat frequencies of the beating signal during the from multiple different subject data periods, the candidate LIDAR data indicating a potential radial velocity and/or a potential distance between the LIDAR system and an object in the sample region; and classifying the candidate LIDAR data such that the candidate LIDAR data does not represent LIDAR data for the sample region, the LIDAR data for the sample region indicating a radial velocity and/or a distance between the LIDAR system and an object located in the sample region.

16. The system of claim 14, further comprising:

calculating candidate LIDAR data from each one of the multiple beat frequencies the beat frequencies of the beating signal from multiple different subject data periods, the candidate LIDAR data indicating a potential radial velocity and/or a potential distance between the LIDAR system and an object in the sample region; and classifying the candidate LIDAR data such that the candidate LIDAR data represents LIDAR data for the sample region, the LIDAR data for the sample region indicating a radial velocity and/or a distance between the LIDAR system and an object located in the sample region.

17. The system of claim 11, wherein the electronics are configured to calculate LIDAR data from each one of the multiple beat frequencies the beat frequency of the beating signal that results from multiple different subject data periods, the LIDAR data indicating a radial velocity and/or distance between the LIDAR system and an object in the sample region.

18. The system of claim 11, wherein the calculation of the LIDAR data excludes the beat frequency of the beating signal during the check data period.

19. The system of claim 11, wherein the sample region is one of multiple different sample regions that are sequentially illuminated by the system output signal and the electronics being configured to calculate the comparative beat frequency for each of the sample regions and to calculate the candidate LIDAR data for each of the different sample regions, the candidate LIDAR data for each of the sample regions being calculated from the beat frequency that results from illumination of the sample region during multiple different data periods, the candidate LIDAR data for each of the sample regions indicating a potential radial velocity and/or potential distance between the LIDAR system and an object located in the sample region, and LIDAR data for each of the sample regions indicating a radial velocity and/or a distance between the LIDAR system and an object located in the sample region;

the electronics being configured to apply one or more check criteria to each of the comparative beat frequencies, in response to the application of the one or more check criteria to the comparative beat frequencies for each of the sample regions in a first portion of the sample regions providing a first result, the electronics being configured to classify the candidate LIDAR data for the sample regions in the first portion of the sample regions such that the candidate LIDAR data for each of the sample regions in the first portion of the sample regions represents the LIDAR data for the sample regions in the first portion of the sample regions, and in response to the application of the one or more check criteria to the comparative beat frequencies for each of the sample regions in a second portion of the sample regions providing a second result, the electronics being configured to classify the candidate LIDAR data for the sample regions in the second portion of the sample regions such that the candidate LIDAR data for each of the sample regions in the second portion of the sample regions does not represent the LIDAR data for the sample regions in the second portion of the sample regions.

20. The system of claim 11, wherein the rate of change in the frequency of the system output signal during the check data periods is different from the rate of change in the frequency of the system output signal during a portion of the multiple subject data periods.

* * * * *